US008423483B2

(12) United States Patent
Sadeh-Koniecpol et al.

(10) Patent No.: US 8,423,483 B2
(45) Date of Patent: Apr. 16, 2013

(54) USER-CONTROLLABLE LEARNING OF POLICIES

(75) Inventors: Norman Sadeh-Koniecpol, Pittsburgh, PA (US); Paul Hankes Drielsma, Pittsburgh, PA (US); Lorrie Faith Candor, Pittsburgh, PA (US); Patrick Kelley, Pittsburgh, PA (US)

(73) Assignees: Carnegie Mellon University, Pittsburgh, PA (US); Wombat Security Technology, Inc., Pittsburgh, PA (US)

( * ) Notice: Subject to any disclaimer, the term of this patent is extended or adjusted under 35 U.S.C. 154(b) by 668 days.

(21) Appl. No.: 12/467,276

(22) Filed: May 16, 2009

(65) Prior Publication Data

US 2010/0036779 A1  Feb. 11, 2010

Related U.S. Application Data

(60) Provisional application No. 61/127,866, filed on May 16, 2008.

(51) Int. Cl.
*G06F 15/18* (2006.01)
(52) U.S. Cl.
USPC .......................................................... 706/12
(58) Field of Classification Search ...................... 706/12
See application file for complete search history.

(56) References Cited

PUBLICATIONS

Prabaker et al ("Understanding and Capturing People's Privacy Policies in a People Finder Application" Sep. 2007).*
Kim et al ("A Case-Based Recommender System Using Implicit Rating Techniques" 2002).*
Gervasio et al ("Active Preference Learning for Personalized Calendar Scheduling Assistance" 2005).*
Das et al ("Designing and Modeling Smart Environments" 2006).*
Reilly et al ("Incremental Critiquing" 2005).*
Gary et al ("Personalised, Collaborative Spam Filtering" 2004).*
Cornwell et al ("User-Controllable Security and Privacy for Pervasive Computing" Feb 2007.*
Karat et al ("Evaluating Interfaces for Privacy Policy Rule Authoring" 2006).*
Jin et al ("Pareto-Based Multiobjective Machine Learning: An Overview and Case Studies" 2008).*
Fei Chen ("Learning Accurate and Understandable Rules From SVM Classifiers" 2004).*
Stumpf et al ("Toward Harnessing User Feedback for Machine Learning" Oct. 2006).*

* cited by examiner

*Primary Examiner* — Lut Wong
(74) *Attorney, Agent, or Firm* — K&L Gates LLP

(57) ABSTRACT

Various embodiments are directed to a computer implemented method for updating a policy that is enforced by a computer program. In one embodiment, a computer communicates, to a user, data regarding one or more decisions made by the program over a period of time according to a policy. Each decision is made on the particular policy in force at the time the decision is made. Policy data for the policy is stored in a machine readable format. The user feedback data indicative of feedback by the user regarding the one or more decisions is stored. The computer identifies and ranks one or more potential variations to the policy based on a score of an objective function for each potential variation. The computer communicates, to the user, one or more suggested modifications based on the ranking of the one or more potential variations to the policy. The computer modifies the policy data based on one or more selections by the user in response to the transmission of the one or more suggested modifications.

43 Claims, 14 Drawing Sheets

*Abstract mathematical policy model*

| | |
|---|---|
| Let P(S) denote the power set of set S | |
| Restriction | Set of possible restrictions |
| Action ∋ ⊥ | Possible actions, including the null action ⊥ |
| Rule = P(Restriction) x P(Action) | Set of rules |
| Policy = P(Rule) | Set of policies |
| Event | Set of policy system events |
| Evaluate ::Policy x Event → P(Action) | Policy enforcement decision function |
| Feedback | Possible user feedback (*e.g.*, Feedback = $\mathbb{N}$) |
| Audit ::Event x P(Action) → Feedback | Audit function |

FIG. 9A

*Example instantiation for a location sharing application*

| | |
|---|---|
| Weekdays | Set of weekdays |
| TimeSpan = [StartTime ... EndTime] | Time spans |
| WeekleyPattern = P(Weekdays) x TimeSpan | Restrictions based on weekly patterns of time intervals |
| User | Set of users of the system |
| Group = P(User) | Groups of users |
| Restriction=WeeklyPattern ∪ User ∪ Group | Set of restrictions for the location sharing application |
| Action = {Disclose, Withhold} | Set of possible disclosure decisions |
| Feedback = {0,1} | Set of possible feedback responses |

FIG. 9B

Transform :: Restriction → P(Restriction)   Restriction transformation function
GenActions :: Action P(Action)
GenRules :: Rule → P(Rule)

$$\text{GenRules}((R,A)) = \bigcup_{r \in R} \bigcup_{r' \in \text{Transform}(r)} (r',A) \cup$$
$$\bigcup_{a \in A} \bigcup_{a' \in \text{GenActions}(a)} (R,a') \cup$$
$$\bigcup_{r \in R} R \setminus \{r\} \cup \bigcup_{r \in \text{Restriction}} R \cup \{r\}$$
$$\bigcup_{a \in A} A \setminus \{a\} \cup \bigcup_{a \in \text{Action}} A \cup \{a\}$$

Neighbor :: Policy → P(Policy)   Neighbor generation function, where $$\text{Neighbor}(P) = \bigcup_{p \in P} \text{GenRules}(p)$$
$$\bigcup_{r \in P} P \setminus \{r\} \cup$$

USER-CONTROLLABLE LEARNING OF POLICIES

CROSS REFERENCE TO RELATED APPLICATION

This application claims the benefit under Title 35, United States Code §119(e), of U.S. Provisional Patent Application Ser. No. 61/127,866, filed May 16, 2008 and entitled "User-Controllable Policy Learning," which is hereby incorporated by reference in its entirety.

BACKGROUND

Computational policies (hereafter referred to as policies) are machine understandable representations of rules that govern a computational agent's behavior. They include security policies, privacy policies, user preferences, workflow policies, and a variety of other application domains. Studies have shown that users generally have great difficulty specifying policies. While machine learning techniques have been used successfully to refine policies such as in recommender systems or fraud detection systems, they are generally configured as "black boxes" that take control over the entire policy and severely restrict the ways in which the user can manipulate it.

A broad and growing number of applications allow users to customize their policies, whether as system administrators, end-users or in other relevant roles. From the network administrator maintaining complex and verbose firewall access control lists to the social networking (e.g., Facebook®) user struggling with the site's privacy settings, studies have consistently shown that novice and expert users alike find it difficult to effectively express and maintain such policies. In one study, for instance, test users asked to express file permission policies within the native Windows® XP interface achieved very low accuracy rates, thus reflecting a significant gap between the users' intended policies and the policies that they manage to express in policy specification languages and their associated interfaces.

Given this difficulty, it is highly desirable to support users in the tasks of policy specification and maintenance, with the aim of helping them narrow this gap. While a number of machine learning applications rely on simple forms of user feedback to improve their performance (e.g., spam filters or recommender systems employed by Amazon and Netflix), little work has been done to develop configurations of these techniques that support closer collaboration between machines and users. Most recommender systems base their recommendations on explicit and/or implicit user ratings of products or services they have been presented. In these systems, however, the user does not have transparency into the underlying policies upon which the system bases its recommendations and, accordingly, the systems' underlying policies appear as a black-box to the user. This makes it significantly more difficult for a user to modify the policy, be it because it does not yet adequately reflect the user's intent or because the user's intended policy has suddenly changed. This same limitation applies to environments where a policy is intended to capture the preferences of multiple users (e.g., multiple system administrators and/or end-users in a complex firewall deployment).

SUMMARY

In one general aspect, the described embodiments are directed to a computer implemented method for updating a policy that is enforced by a computer program. In one embodiment, a computer system communicates, to at least one user, data regarding one or more decisions made by the program over a period of time according to a policy. Each decision is made based on the particular policy in force at the time the decision was made. The policy data for the policy is stored in a machine readable format in a memory coupled to the computer system. The computer system comprises at least one processor coupled to a memory. User feedback data indicative of feedback by the at least one user regarding the one or more decisions made by the program according to the policy is stored in a machine readable format. The computer system identifies and ranks one or more potential variations to the policy based on a score of an objective function. The objective function comprises a plurality of function elements. The plurality of function elements comprises a user satisfaction function element and at least one other function element that measures the extent to which the one or more potential variations are likely to be understandable by the at least one user. The computer system communicates, to the at least one user, one or more suggested modifications to the policy based on the ranking of the one or more potential variations to the policy. The one or more suggested modifications can assist the at least one user refine the policy. In one embodiment, the at least one user can accept, reject, or modify one or more of the suggested policy modifications. Acceptance, rejection, or modifications by the at least one user of the suggested policy modifications can themselves be used as an additional source of user feedback. The computer system modifies the policy data stored in the memory based on one or more selections by the at least one user in response to the communication of the one or more suggested modifications.

FIGURES

The novel features of the various described embodiments are set forth with particularity in the appended claims. The various embodiments, however, both as to organization and methods of operation may be understood in accordance with the following description taken in conjunction with the accompanying drawings as follows.

FIG. 1 thus illustrates one example of a suitable computing system environment in which the described embodiments may be implemented.

FIG. 9A illustrates an abstract policy model in terms of condition/action rules.

FIG. 9B illustrates one instantiation of the abstract policy model shown in FIG. 9A in the context of a location sharing privacy application.

FIG. 10 illustrates one implementation of a framework for transforming the policy transformation.

FIG. 13 is a screenshot of a location sharing system feedback interface and location.

Figure 17:
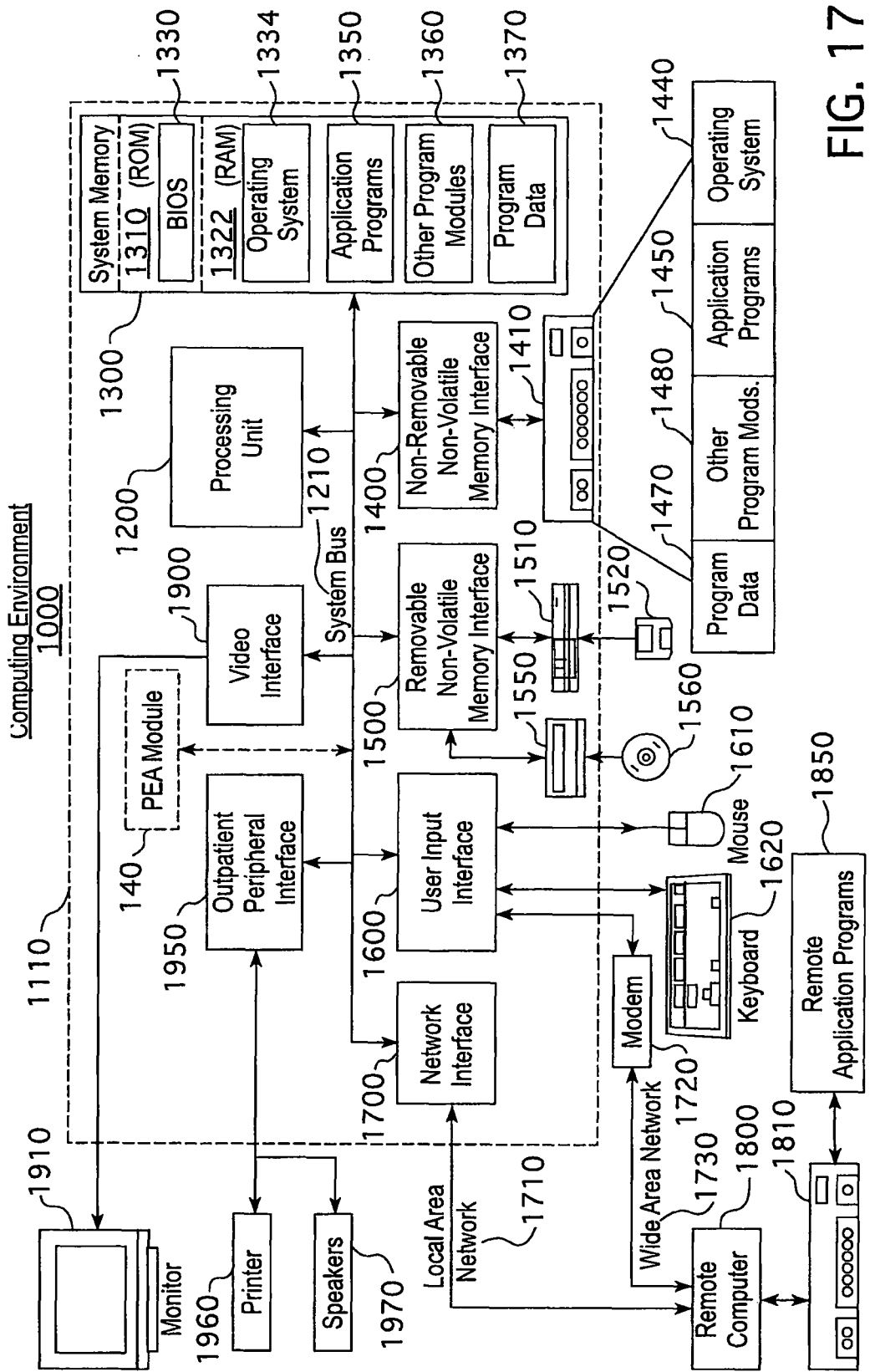

FIG. 17 thus illustrates one example of a suitable computing system environment in which the described embodiments may be implemented.

DESCRIPTION

Various embodiments are directed to apparatuses, systems, and methods for user-controllable learning of policies enforced by a computer system. It will be appreciated by those skilled in the art, however, that a computer system may be implemented as an electronic computer, photonic computer, quantum computer, neural computer, mechanical computer, and the like. The computer system can be configured to enforce policies. Numerous specific details are set forth to provide a thorough understanding of the overall structure, function, manufacture, and use of the embodiments as described in the specification and illustrated in the accompanying drawings. It will be understood by those skilled in the art, however, that the described embodiments may be practiced without the specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

In one general aspect, a user-controllable policy learning system according to the described embodiments assists users refine policies based on user feedback. Policies may be defined as a collection of rules and can be used to guide a broad range of decisions. They include security and privacy policies, workflow policies, corporate policies, user preferences and more. The user-controllable policy learning system is applicable in any domain where users specify such policies. This may include firewall policies, spam filtering policies, calendar sharing policies, location sharing policies in cell phone friend finder applications, file access permission policies, Facebook® privacy policies, dispute resolution policies and the like. This may also include preferences organized according to various attributes such as preferences on web sites such as Amazon® or Netflix®, restaurant recommendation preferences, dating site preferences, carpooling preferences, message filtering and forwarding preferences (e.g., in the context of multi-channel messaging systems such as that provided by Microsoft®). For conciseness and clarity, throughout the remainder of this specification, references to a policy or policies is intended to cover all applicable domains in which users specify preferences, policies, and/or combinations thereof.

The user-controllable policy learning system applies to a wide range of application domains (e.g., specifying privacy or security policies, capturing user preferences for different types of movies, restaurants or carpooling partners, as previously discussed) where users have been shown to have difficulty expressing policies and are willing to occasionally provide feedback on decisions made based on possibly imperfect specifications of their policies. The term user includes any number of users including an end user, a policy administrator, a person associated with specifying and modifying the policy, and the like. Using this feedback, the user-controllable policy learning system generates suggestions for the user on how to modify existing policies. In contrast to traditional machine learning solutions, which generate brand new policies that are not specifically meant to be understood by users, user-controllable policy learning offers a solution capable of suggesting user-understandable modifications to an existing policy. Ultimately, the user continues to understand and retains control over the policies as they evolve—in contrast to having a "black box" learning algorithm take over and develop policies that the user can no longer relate to. As the user remains in control, the user can directly manipulate their policies if or when they identify inaccuracies in them (e.g., because they failed to properly specify them, because learning imperfectly refined them, or simply because their preferences/policies have changed). The resulting approach is one where user and machine learning can work hand in hand and complement one another.

In various embodiments, a user-controllable policy learning system provides transparency to the user of the underlying policy upon which the system bases its decisions. As such, the system's underlying policy does not appear as a black-box to the user, but rather, appears as a user-understandable model of the user's policies. Improvements can thus be undertaken by the policy learning system or the user, with both manipulating the same common policy. The end result is an approach where the user continues to understand the policy as it evolves.

Furthermore, because the user can understand the suggested modifications being presented, the user can decide whether or not to accept, reject, or modify them. Accordingly, in one configuration the learning system can ensure that no modifications to the policy are undertaken without explicit user consent. This is particularly critical in the context of security and privacy policies, where all elements of the policy need to be vetted.

With full control of the policy, the user can account for sudden policy changes that machine learning would adapt to only slowly (e.g., a user's privacy preferences might be very different when on vacation). This significantly reduces the risk of the system introducing particularly poor policy decisions. This is of heightened importance in the context of security and privacy policies where poor policy modifications could have negative consequences.

Before describing various embodiments and implementation details of a user-controllable policy learning system, a suitable computing environment in which the various embodiments may be implemented will be described. Accordingly, FIG. 1 and the following discussion are intended to provide a brief general description of a suitable computing environment in which the described embodiments for user-controllable learning of policies may be implemented. It should be understood, however, that handheld, portable, and other computing devices and computing objects of all kinds are contemplated for use in connection with the described embodiments. While a general purpose computing environment is described, this is but one example, and the described embodiments may be implemented with other computing devices, such as a client having network/bus interoperability and interaction. Thus, the described embodiments may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the described embodiments.

Moreover, those skilled in the art will appreciate that the described embodiments may be practiced with other computer configurations. Other well known computing systems, environments, and/or configurations that may be suitable for use with the described embodiments may comprise personal computers (PCs), server computers, hand-held or laptop devices, multi-processor systems, microprocessor-based systems, programmable consumer electronics, network PCs, minicomputers, mainframe computers, mobile computing devices, which may comprise or be implemented as a combination handheld computer and mobile telephone or smart phone such as a Palm® Treo™ smart phone as well as other types of wireless computing devices having voice and/or data communications functionality such as a handheld device, personal digital assistant (PDA), mobile telephone, combination mobile telephone/PDA, mobile unit, subscriber station, game device, messaging device, media player, pager, or any other suitable communications device in accordance with the described embodiments. The described embodiments also may be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

Although not required, the described embodiments can be implemented via an operating system, for use by a developer of services for a device or object, and/or included within application software that operates according to the described embodiments. Suitable operating systems include, but are not limited to, UNIX® from the SCO Group, Inc., GHOST for UNIX®, WINDOWS® from MICROSOFT® OS (e.g., 95, 98, NT, ME, 2000, XP, CE, Longhorn, Vista), MAC OS X from Apple Computer, Inc., Internetwork Operating System (IOS) from Cisco, Juniper JUNOS, IBM OS, LINUX, SOLARIS, 3COM, PALM OS, and the like. Software may be described in the general context of computer-executable instructions, such as program modules, being executed by one or more computers, such as client workstations, servers or other devices. Generally, program modules include routines, programs, objects, components, data structures, and the like that perform particular tasks or implement particular abstract data types. Generally, the functionality of the program modules may be combined or distributed as desired in various embodiments.

Figure 1:
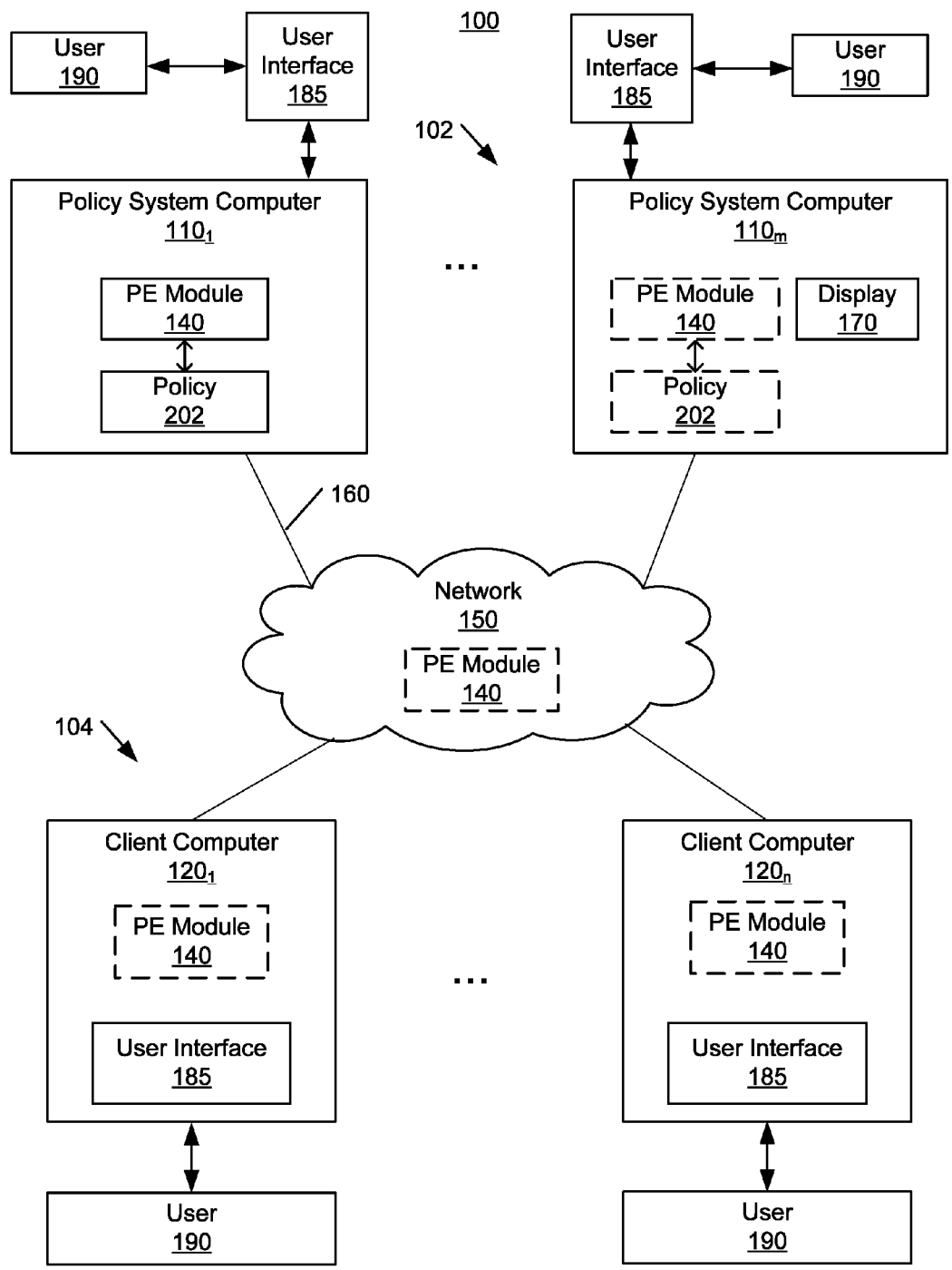

FIG. 1 thus illustrates one example of a suitable computing system environment 100 in which the described embodiments may be implemented. Although as made clear above, the computing system environment 100 is only one example of a suitable computing environment and is not intended to suggest any limitation as to the scope of use or functionality of the described embodiments. FIG. 1 illustrates one embodiment of a system 100. The system 100 may comprise a communication system having multiple nodes. A node generally may comprise any physical or logical entity for communicating information in the system 100 and may be implemented as hardware, software, or any combination thereof, as desired for a given set of design parameters or performance constraints. Although FIG. 1 may show a limited number of nodes by way of example, it can be appreciated that additional or fewer nodes may be employed in a given implementation.

As shown in FIG. 1, the system 100 may be realized as a network 150 comprising nodes 102 and 104. In various embodiments, the nodes 102, 104 may be arranged to operate as computers $110_{1-n}$ and $120_{1-m}$ (where n and m may be any positive integer) connected via the network 150. In one embodiment, the computers $110_{1-n}$ and $120_{1-m}$ may communicate with the network 150 via a network interface 160, for example. For conciseness and clarity, the description a suitable general purpose computing system in which the computers $110_{1-n}$ and $120_{1-m}$ may be implemented is deferred to the discussion with reference to FIG. 17 hereinbelow.

As used herein, a node may comprise any physical or logical entity having a unique address in the system 100. The unique address may comprise, for example, a network address such as an IP address, a device address such as a Medium Access Control (MAC) address, and so forth. The user 190 can access the system from any node, including multiple nodes at the same time.

In one embodiment, the system 100 may be arranged such that the nodes 102, 104 may be arranged as any one of the computers $110_{1-n}$ and $120_{1-m}$ and may be configured to share the interface 160 to the network 150 (e.g., a LAN interface). In one embodiment, any two or more computers $110_{1-n}$ and $120_{1-m}$ may share a single IP address because of limited allocation of IP addresses in the network 150 (e.g., IPv4) or because any two or more computers $110_{1-n}$ and $120_{1-m}$ may likely be accessed using a single IP address or using the same name for the network 150 as though it was a single system, for example.

The nodes 102, 104 of the system 100 may comprise or form part of the network 150, such as a LAN, a Metropolitan Area Network (MAN), a Wide Area Network (WAN), a Wireless LAN (WLAN), an Internet network, a World Wide Web network, a telephony network (e.g., analog, digital, wired, wireless, Public Switched Telephone Network (PSTN), Integrated Services Digital Network (ISDN) or Digital Subscriber Line (xDSL)), a radio network, a television network, a cable network, a satellite network, and/or any other wired or wireless communications network configured to carry data. The network 150 may include one or more elements, such as, for example, intermediate nodes, proxy servers, firewalls, routers, switches, hubs, adapters, sockets, and wired or wireless data pathways, configured to direct and/or deliver data to other networks.

In one embodiment, the nodes 102, 104 may be arranged to operate in accordance with one or more protocols, such as MAC protocols, such as from the IEEE 802.3 series of Ethernet protocols, for example. The nodes 102, 104 may be implemented as a high bandwidth switch, such as a Fast Ethernet switch operating at 100 megabits per second (Mbps), a Gigabit Ethernet switch operating at 1000 Mbps or 10 Gigabits per second (Gbps), a router configured as a DHCP server, and so forth.

The nodes of the system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. Other types of information include, without limitation, context information, e.g., information about the user 190 such as location, calendar, policy information, logging information, and the like. The information may be communicated from and to a number of different devices or networks.

The nodes of the system 100 may communicate in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, the system 100 may comprise a packet network communicating information in accordance with one or more packet protocols, such as one or more Internet protocols, including the Transport Control Protocol (TCP) and IP, TCP/IP, X.25, Hypertext Transfer Protocol (HTTP), User Datagram Protocol (UDP), and DHCP protocol. In another example, the system 100 may communicate packets using a medium access control protocol such as Carrier-Sense Multiple Access with Collision Detection (CSMA/CD), as defined by one or more IEEE 802.x Ethernet standards. In yet another example, the system 100 may communicate packets in accordance with one or more Asynchronous Transfer Mode (ATM) protocols, Frame Relay, Systems Network Architecture (SNA), and so forth. It will be appreciated that the system 100 may communicate packets in accordance with more than one or all of these standards simultaneously.

In various embodiments, the system 100 may be illustrated and described as comprising several separate functional elements, such as modules and/or blocks. Although certain modules and/or blocks may be described by way of example, it can be appreciated that additional or fewer modules and/or blocks may be used and still fall within the scope of the embodiments. Further, although various embodiments may be described in terms of modules and/or blocks to facilitate description, such modules and/or blocks may be implemented by one or more hardware components (e.g., processors, Digital Signal Processors (DSPs), Programmable Logic Devices (PLDs), Application Specific Integrated Circuits (ASICs), circuits, registers), software components (e.g., programs, subroutines, logic), and/or combinations thereof.

In various embodiments, the system 100 may comprise multiple modules connected by one or more communications media. Communications media generally may comprise any medium capable of carrying information signals. For example, communications media may comprise wired communications media, wireless communications media, or a combination of both, as desired for a given implementation. Examples of wired communications media may include a wire, cable, printed circuit board (PCB), backplane, semiconductor material, twisted-pair wire, co-axial cable, fiber optics, and so forth. An example of a wireless communications media may include portions of a wireless spectrum, such as the radio-frequency (RF) spectrum.

The modules may comprise, or may be implemented as, one or more systems, sub-systems, devices, components, circuits, logic, programs comprising computer executable instructions, or any combination thereof, as desired for a given set of design or performance constraints. For example, the modules may comprise electronic elements fabricated on a substrate. In various implementations, the electronic elements may be fabricated using silicon-based Integrated Circuit (IC) processes such as complementary metal oxide semiconductor (CMOS), bipolar, and bipolar CMOS (BiCMOS) processes, for example.

Some computer applications may comprise two or more computer systems each comprising a network management module embedded within a host computer computational platform that share an interface to the network 150. In one embodiment, the two or more computer systems may share a single IP address. The two or more computer systems comprising a network management module may work together or separately, so that when one computer is shut down, hanged, or in standby, the other one is still functional and may be accessed over the network 150 and may operate on behalf of the inoperable computer, for example.

In one embodiment, a network management module may comprise a Network Interface Chip (NIC) that serves a host OS with its own OS driver that includes an embedded manageability module to operate and communicate over the network 150 (e.g., LAN, Internet) while the host computer system is operational as well as when the host computer system and its OS are inoperable, disconnected, shutdown, hanged or in standby mode.

In one embodiment, the user-controllable policy learning system functionality may be implemented by a policy engine (PE) module 140. The PE module 140 according to the described embodiments assists users refine policies based on user feedback. In various embodiments, the PE module 140 may be deployed at any node 102, 104 such as any one or all of the two or more computers $110_{1-n}$ and $120_{1-m}$ as well as the network 150. In the illustrated embodiment, the computers $110_{1-m}$ and the PE module 140 are provided within the same computational platform (e.g., a single computer system), for example. In one embodiment, the PE module 140 may be provided as a separate module located on different computational platforms or separate remote computer systems, for example. In one embodiment, the modules, sub-modules, components or elements of the system 100 may comprise, for example, a network management module to manage computational platform deployment and maintenance in an Information Technology (IT) organization or environment. The computers $110_{1-m}$ and $120_{1-n}$ each may comprise a display device $170_{1-m}$ and $180_{1-n}$, respectively, to communicate information to one or more users $190_{1-m}$ operating the computers $110_{1-m}$ and/or to one or more users $190_{1-n}$ operating the computers $120_{1-n}$.

In various implementations, the computers $110_{1-n}$, $120_{1-m}$, and/or the PE module 140 may be arranged to perform various processing operations. Processing operations may generally refer to one or more operations, such as generating, managing, communicating, sending, receiving, storing, forwarding, accessing, reading, writing, manipulating, encoding, decoding, compressing, decompressing, encrypting, filtering, streaming or other computerized processing of information, which may be implemented by executing computer program instructions. Accordingly, the computers $110_{1-n}$, $120_{1-m}$, and/or the PE module 140 may comprise embedded applications implemented as firmware, software, hardware or any combination thereof, for example. The PE module 140 may comprise various executable modules such as software, programs, data, drivers, application program interfaces (APIs), and so forth. The firmware may be stored in NVM, such as in bit-masked read-only memory (ROM) or flash memory. In various implementations, storing the firmware in ROM may preserve flash memory. The NVM may comprise other types of memory including, for example, programmable ROM (PROM), erasable programmable ROM (EPROM), electrically erasable programmable ROM (EEPROM), or battery backed random-access memory (RAM) such as dynamic RAM (DRAM), Double-Data-Rate DRAM (DDRAM), and/or synchronous DRAM (SDRAM).

In one embodiment, the PE module 140 provides functionality to enable the user(s) $190_{1-(n+m)}$ to control learning of policies 202 in a variety of application domains, such as security privacy policies, models of user preferences in, for example, recommender systems, and policies in supervisory control and data acquisition (SCADA) systems. In one embodiment, the PE module 140 provides incremental manipulation of policies 202 in a context in which the system 100 and the user(s) $190_{1-n}$ can refine a common policy 202. In one implementation, this may be achieved by the user(s) $190_{1-n}$ providing feedback on decisions, each of which is made based on the policy 202 in force at the time the decision is taken, and using the feedback to identify (learn) incremental policy improvements which are presented as suggestions to the user(s) $190_{1-n}$, by way of a user interface 185. The policy 202 may, for the sake of example, and not limitation, be stored locally, externally on policy-relevant devices such as firewalls and/or routers, in a central policy repository, on multiple distributed nodes, or "in the cloud." The policy 202 may be expressed as collections of condition/action rules sufficient to capture a broad range of policies, including a wide variety of policies such as XACML policies, among others. The user(s) $190_{1-n}$, in turn, can review these suggestions and decide which, if any, to accept, reject, or modify. The incremental nature of the suggestions enhances usability, and because the user(s) $190_{1-n}$ and the system 100 manipulate a common policy representation, the user(s) $190_{1-n}$ retains control and can still make policy modifications by hand.

Figure 11:
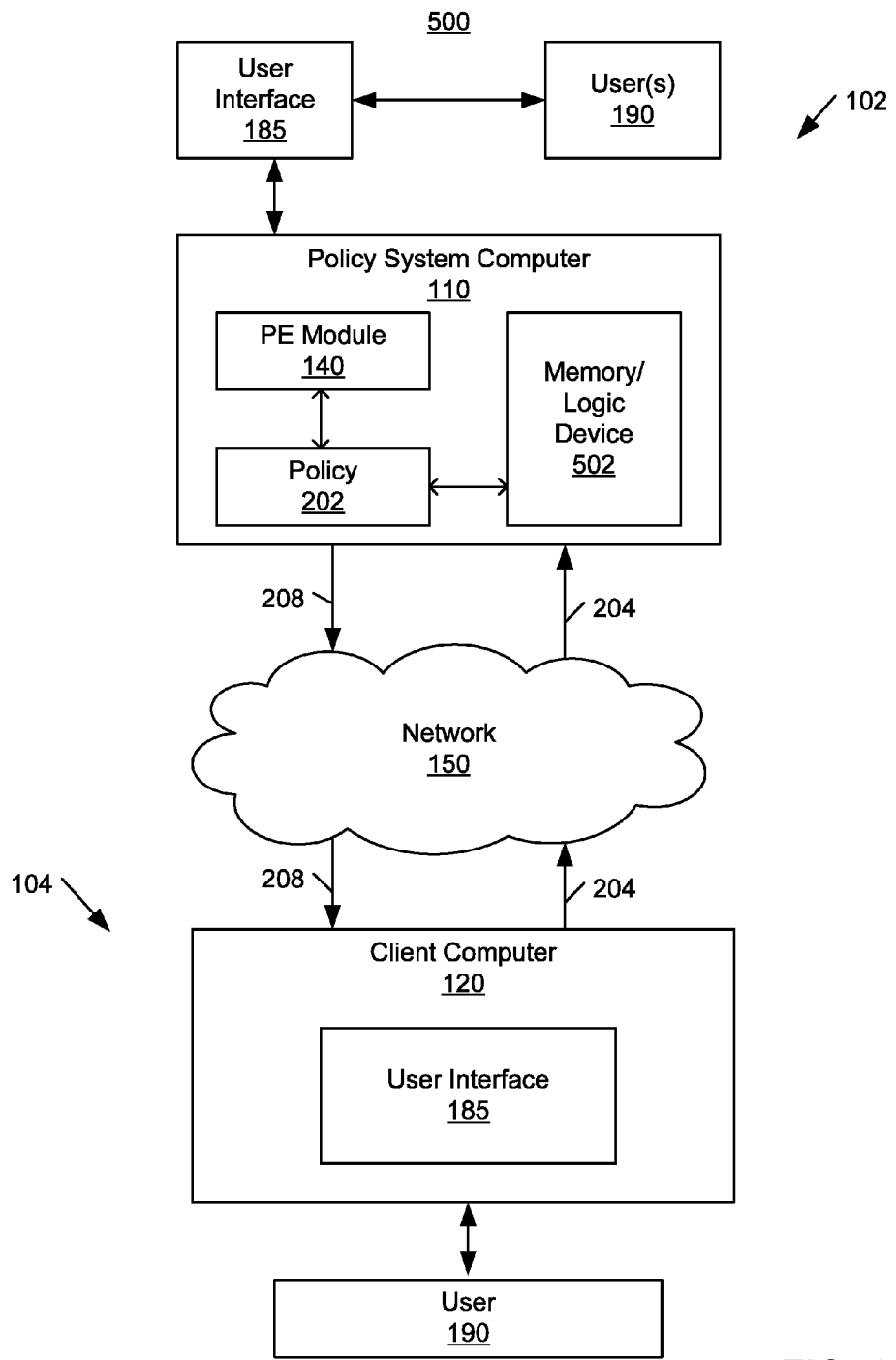
FIG. 11 illustrates one embodiment of a system suitable for executing a computer implemented method for updating a policy that is enforced by a computer program such as the policy engine module executed by the policy system computer.

Various functional aspects of the PE module 140 are subsequently described with respect to FIGS. 2, 11, and 12. In various embodiments, the user-controllable learning process in accordance with the described embodiments be implemented or applied in a variety of contexts within a suitable computing environment such as those illustrated by system 100, 200 (FIG. 2), and 500 (FIG. 11). Accordingly, by way example, and not limitation, the process may be implemented as a user-controllable learning process in the context of a network firewall, wherein the policy 202 is configured to govern the filtering behavior of the firewall in response to incoming and outgoing packets on the network 150. As applied in the context of an application level firewall, the policy 202 governs the behavior of the policy system computer 110 (e.g., the policy enforcement computer) in response to traffic on the network 150 that pertains to specific applications. In other implementations, the process may be applied in the context of an intrusion detection system, wherein the policy 202 is configured to determine patterns of traffic on the network 150 that will or will not be considered indicative of an intrusion. In other implementations, the process may be applied in the context of social networking applications, wherein policy 202 is configured to govern the selective disclosure of all types of personal information of the user 190. In other implementations, the process may be applied in the context of routing devices on the network 150, wherein the policy 202 is configured to govern the routing of packets on the network 150. In other implementations, the process may be applied in the context of home networking devices such as routers, firewalls, and access points wherein the policy 202 is configured to govern the behavior, connectivity, and security of the home networking device. In other implementations, the process may be applied in the context of recommender systems for products and services, wherein the policy 202 is defined as a model of the preferences, likes, and dislikes of the user 190 pertaining to the products and services in question. In other implementations, the process may be applied in the context of software development environments for programming, debugging, and static analysis wherein the policy 202 is defined as a set of patterns within computer programs that represent errors or inefficiencies and a set of proposed improvements to the errors or inefficiencies. In other implementations, the process may be applied in the context of email filtering applications wherein the policy is configured to determine which email messages will be deemed to be "spam" or junk emails, "phishing," or illegitimate solicitation emails, or legitimate emails. The implementation and application contexts described above are not limited in this context.

Figure 2:
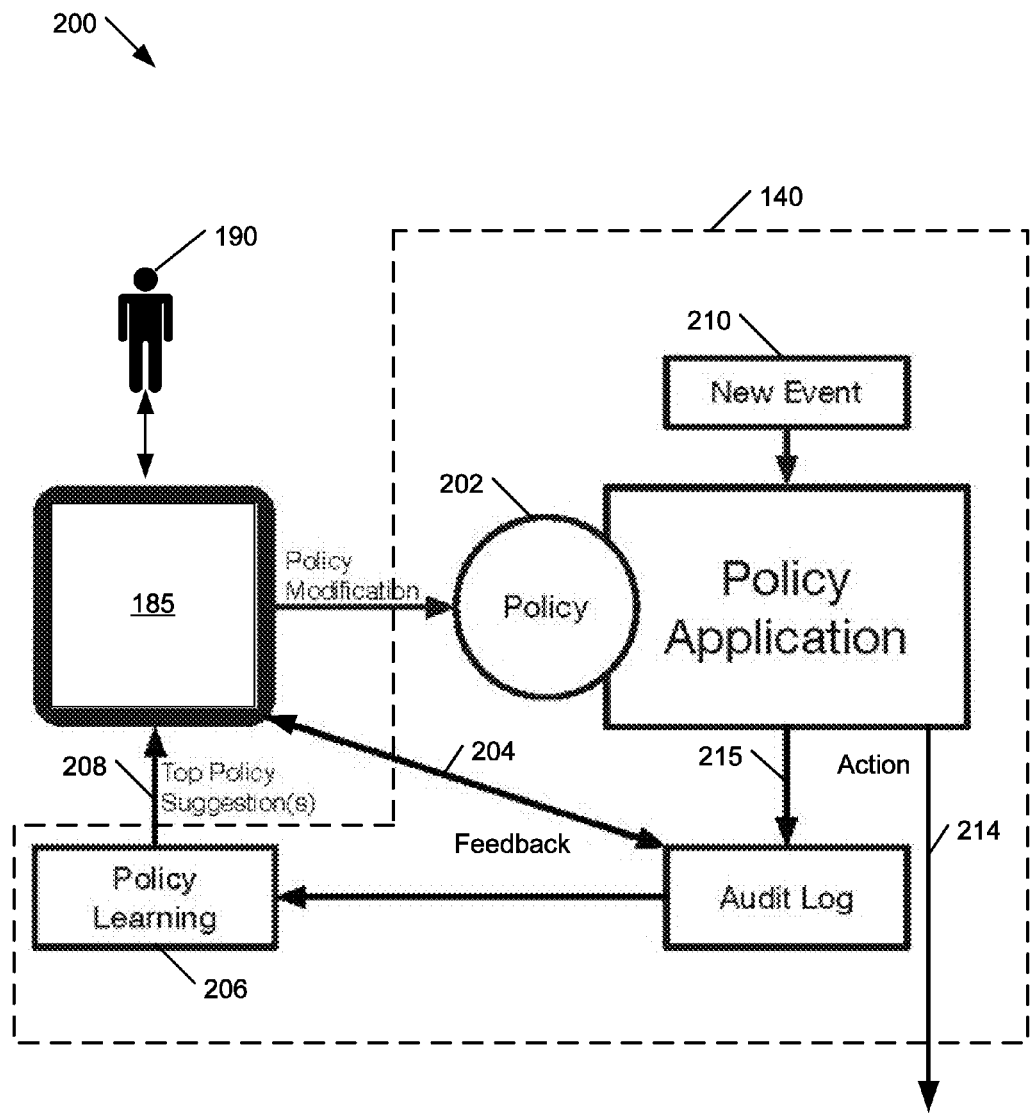
FIG. 2 illustrates a general usage diagram illustrating a user-controllable learning process.

FIG. 2 illustrates a general usage diagram 200 illustrating a user-controllable learning process. As described in FIG. 2, the process is implemented with respect to the single computers 110, 120 described generally in FIG. 1 connected in the system 100 environment. The PE module 140 provides the functionality to enable the user 190 to control learning of policies 202 in a variety of application domains. Any reference to the system in this context may refer either to the computers 110, 120 and/or the PE module 140 or any combination thereof. Furthermore, although a policy system computer 110 (e.g., the policy enforcement computer) and the PE module 140 may be implemented on any nodes 102, 104 of the system 100, for purpose of conciseness and clarity, and not limitation, in the description that follows the computer 110 is implemented as a single policy system computer 110 comprising the PE module 140 functionality and the computer 120 is implemented as a single client computer 120 operated by a single end user 190. It should be understood, however, that the policy system computer 110 and the client computer 120 may comprise one or more computers $110_{1-m}$, $120_{1-n}$ operated by one or more users 190 as described in FIG. 1 and all are contemplated for use in connection with the described embodiments. It should be further understood, that the user 190 comprises not only a single user, but rather comprises any one of an end user, an administrator of the policy enforcing computer system, and a person associated with specifying and modifying the policy. In operation, the policy system computer 110 communicates with the client computer 120 via the network 150 (FIG. 1) and the client computer 120 presents information communicated by the policy system computer 110 to the user 190 by way of one or more user interfaces 185 (FIG. 1).

Accordingly, in one embodiment the PE module 140 enables a user-oriented approach to refining the policy 202 that collects feedback 204 from the user 190 to help identify (or learn) 206 incremental improvements to the policy 202. The most promising incremental improvements, or suggested policy modifications 208, e.g., top policy suggestions, are presented to the user 190 via a user interface, who in turn decides whether or not to accept, reject, or modify them. This user-controllable learning approach contrasts with black box configurations in which most machine learning techniques are traditionally deployed. Rather than restricting the level of control the user 190 has over the policy 202, for example, limiting the user 190 to providing occasional feedback on system decisions, the user-controllable learning process, as implemented by the PE module 140 in accordance with the described embodiments, enables the user 190 and the policy system computer 110 to work in tandem on a common policy 202. By focusing on incremental changes to the policies 202 already in force, the user-controllable learning process according to the described embodiments makes it easier for the user 190 to understand the suggested policy modifications 208 and decide whether or not to accept, reject, or modify them. A policy already in force may include, without limitation, a policy specified by a user, a default policy that shipped with a device, a null policy, and the like. An audit log 212 is provided to store one or more policy decision records 215. The audit log 212 is provided to maintain a record of (a) the actions 214 taken in response to incoming events 210 in accordance with the policy currently in force 202, and (b) the feedback 204 collected from the user 190 on these actions 214. Actions taken as a result of application of a policy 202 may include actions such as the disclosure of information either in full detail or in an obfuscated form (e.g., disclosing the city the user is in but not the street address he is at), or no action. An action 214 may be a logical action, and/or a physical action taken in accordance with the policy 202. More than one action can be taken as a result of a single event. An action 214 may include transmitting a signal by the PE module 140 to open a door, take a picture, filter an electronic mail, transfer a packet, making a logical inference, launching a new process, and the like. It will be appreciated by those skilled in the art that the physical action 214 may be enforced by a policy enforcement point rather than a policy decision point. Upon acceptance by the user 190, those suggested policy modifications 208, subject to whatever additional modifications the user 190 may have made to these suggestions, are incorporated into the policy 202, and the resulting modified policy becomes the new policy in force. Although some of the directed arrows in FIG. 2 (and other figures throughout the present specification) intended to reflect the direction of information flow are shown as uni-directional, those skilled in the art will appreciate that information may flow bi-directionally based on system implementation and design constraints. For example, with reference to FIG. 2, the user 190 provides feedback 204 because he or she is able to view the policy decision records 215 stored in the audit log 212.

At any point in time, the user 190 can override the system and make changes without the assistance of the policy system computer 110. This is particularly useful in situations where new conditions or events 210 arise (e.g., changes in the user's 190 social network, new types of network attacks) and where user-defined changes are more effective than waiting for the policy system computer 110 to refine the policies 202 or relearn from scratch. In addition, allowing the user 190 to retain control over improvements learned by the policy system computer 110 reduces the risk of introducing particularly bad policy modifications. This is especially important when dealing with policies 202 where the ramifications of an incorrect policy decision can be quite costly, but useful in any environment where the users 190 benefit from this additional control.

In one embodiment, the user-controllable learning process provides a simplified interface for the user 190 to interact with the policy system computer 110, which is simpler than the interaction between the user 190 and the policy system computer 110 with the languages and associated interfaces used to specify the policies 202 themselves. Accordingly, the PE module 140 provides suggested policy modifications 208 to the user 190 upon which the user 190 can base its response. This provides the advantage of presenting the user 190 with practical, concrete, understandable, and useful examples of suggested policy modifications 208.

Accordingly, to promote the understandability and usability of the policy learning system in accordance with the described embodiments, the user-controllable learning process provides system transparency to enable the user 190 to maintain control over the policy 202 and any modifications thereto at all times. To ensure control over system-based changes, the user-controllable learning process provides a selection of improvements, leaving control as to whether to accept, reject, or modify any of the suggested policy modifications 208 or suggestions up to the user 190. Thus, the user 190 retains full control over policy modifications. This may be a consideration when it comes to the disclosure of personal information, which is has been shown to be an integral component of the user's 190 perception of privacy. Accordingly, the user-controllable learning process according to the described embodiments provides the functionality to enable the user 190 to make changes directly to the policy 202 at any time. This is in contrast to current recommender systems, where the user's sole interaction with the system is through provision of feedback.

FIGS. 3-6 illustrate examples of a natural language interface 300 that may be employed to present suggested policy modifications 208 to the user 190 and receive feedback 204 therefrom. The natural language interface 300 provides feedback from the policy system computer 110 by suggesting some modifications to the policy 202 currently in force. By way of example, and not limitation, the illustrated natural language interfaces 300 enables the user 190 to interact with the policy system computer 110 by presenting the suggested policy modifications 208 to the user 190 a form of human language. In other implementations, the natural language interface 300 also may be employed in the context of new kinds of data loss prevention solutions, firewalls, and the like, as described in more detail below.

The natural language interface 300 also may incorporate one or more user feedback elements such as text input boxes, check box (GUI), clickable buttons, clickable text, and so on, as a means for the user 190 to provide feedback 204 to the PE module 140. Some of these may be highlighted by three-dimensional shading or color. By way of example and not limitation, the illustrated natural language user interface 300 enables the user 190 to interact with the PE module 140 through the one or more feedback elements.

Figure 3:
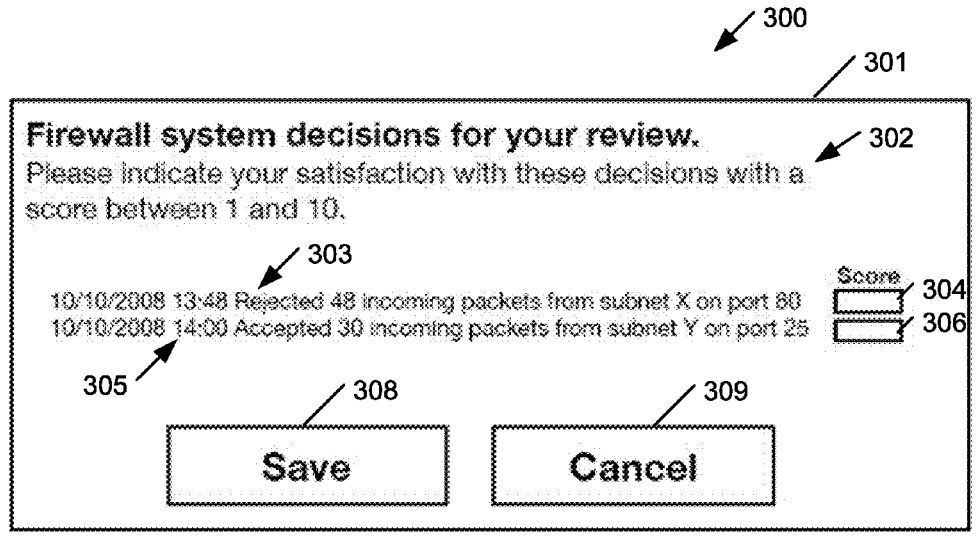
FIG. 3 illustrates one embodiment of a natural language user interface as applied in the context of a firewall application.

FIG. 3 illustrates one embodiment of a natural language user interface 300 as applied in the context of a firewall application. With reference to FIGS. 1-3, the interface 300 displays a first screen 301 prompting the user 190 of firewall system decisions 303, 305 for the user 190 to review. A natural language string 302 asks the user 190 for user satisfaction feedback of the decisions 303, 305 on a scale of 1 to 10. The feedback on each decision 303, 305 may be entered into text input boxes 304, 306, respectively, by the user 190. The user 190 can save 308 the feedback or cancel 309 the transaction.

Figure 4:
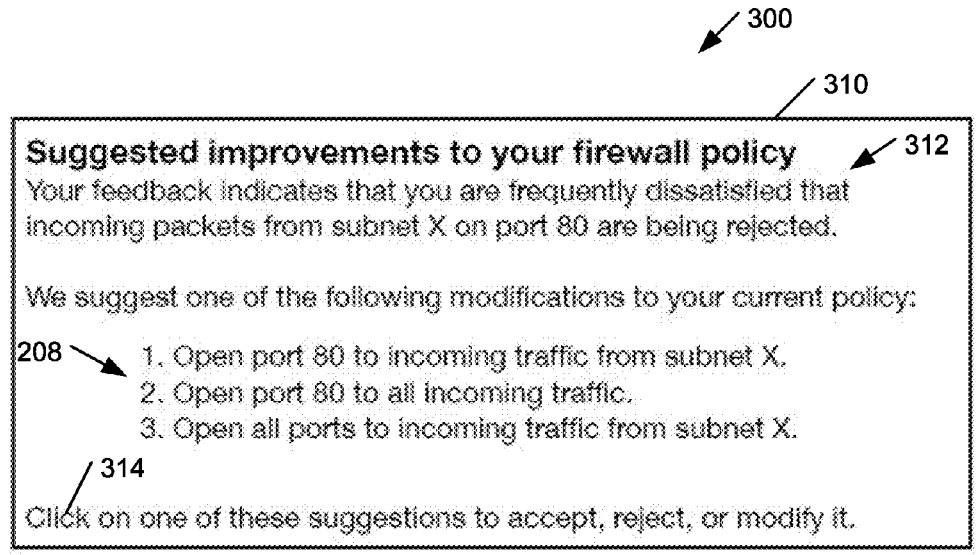
FIG. 4 illustrates one embodiment of the natural language user interface as applied in the context of a firewall application.

FIG. 4 illustrates one embodiment of the natural language user interface 300 as applied in the context of a firewall application. With reference to FIGS. 1-4, in response to the feedback scores 304, 306 the interface 300 displays a screen 310 prompting the user 190 of suggested improvements to the user's 190 firewall policy. A natural language string 312 states that the user's 190 feedback on the decision 303 indicates that the user 190 is frequently dissatisfied that packets from subnet X on port 80 are being rejected. Accordingly, the PE module 140 provides suggested policy modifications 208 to the user 190 asking the user 190 to select one of three suggested policy modifications 208. The user 190 can click 314 on one of the suggestions to accept, reject, or modify the selected suggested policy modifications 208.

Figure 5:
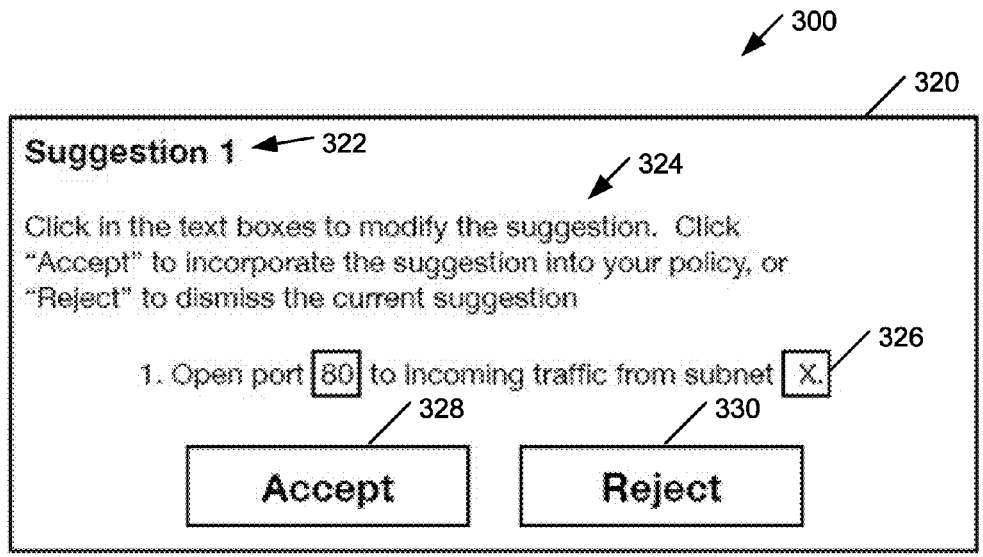
FIG. 5 illustrates one embodiment of the natural language user interface as applied in the context of a firewall application.

FIG. 5 illustrates one embodiment of the natural language user interface 300 as applied in the context of a firewall application. With reference to FIGS. 1-5, in response to the suggested policy modification 208, to open port 80 to incoming traffic from subnet X, the interface 300 displays a screen 320 prompting 324 user 190 of the policy modification 326 selected via the previous screen 310, e.g., suggestion 1 in this example. A natural language string 324 is asks the user 190 to click in the text boxes to modify the suggestion, click "Accept" 328 to incorporate the suggestion into the user 190 policy 202 or "Reject" 330 to dismiss the current suggestion.

Figure 6:
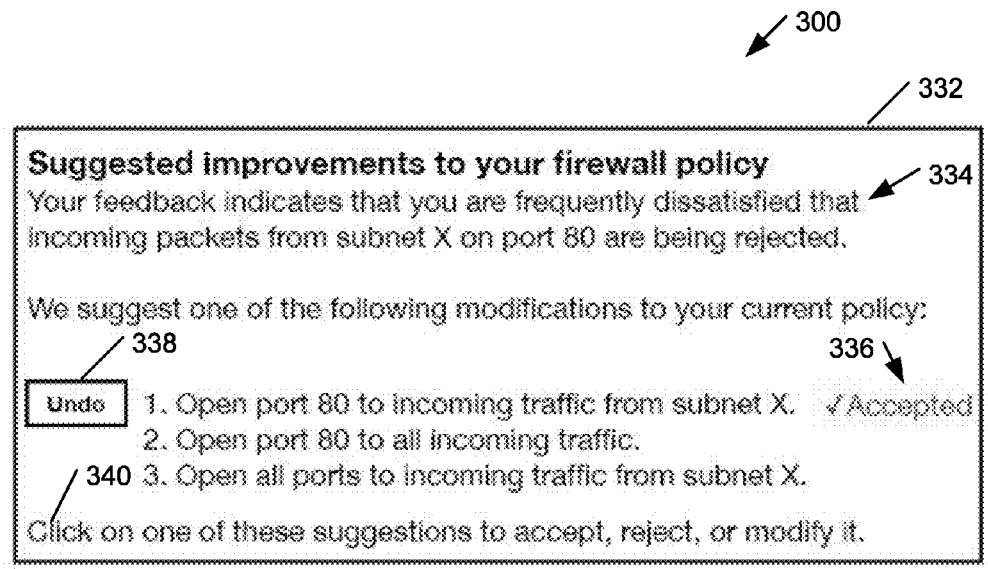
FIG. 6 illustrates one embodiment of the natural language user interface as applied in the context of a firewall application.

FIG. 6 illustrates one embodiment of the natural language user interface 300 as applied in the context of a firewall application. With reference to FIGS. 1-6, in response to the acceptance by the user 190 of the suggested policy modification 208, to open port 80 to incoming traffic from subnet X, the interface 300 displays a screen 332 prompting 334 user 190 of the suggested improvements to the user's 190 firewall policy 202. "Accepted" 336 is displayed to the right of the selected suggested policy modification 208, and an "Undo" button 338 is displayed to the left. The user 190 can click on any of these suggestions to accept, reject, or modify the selection.

Figure 7A:
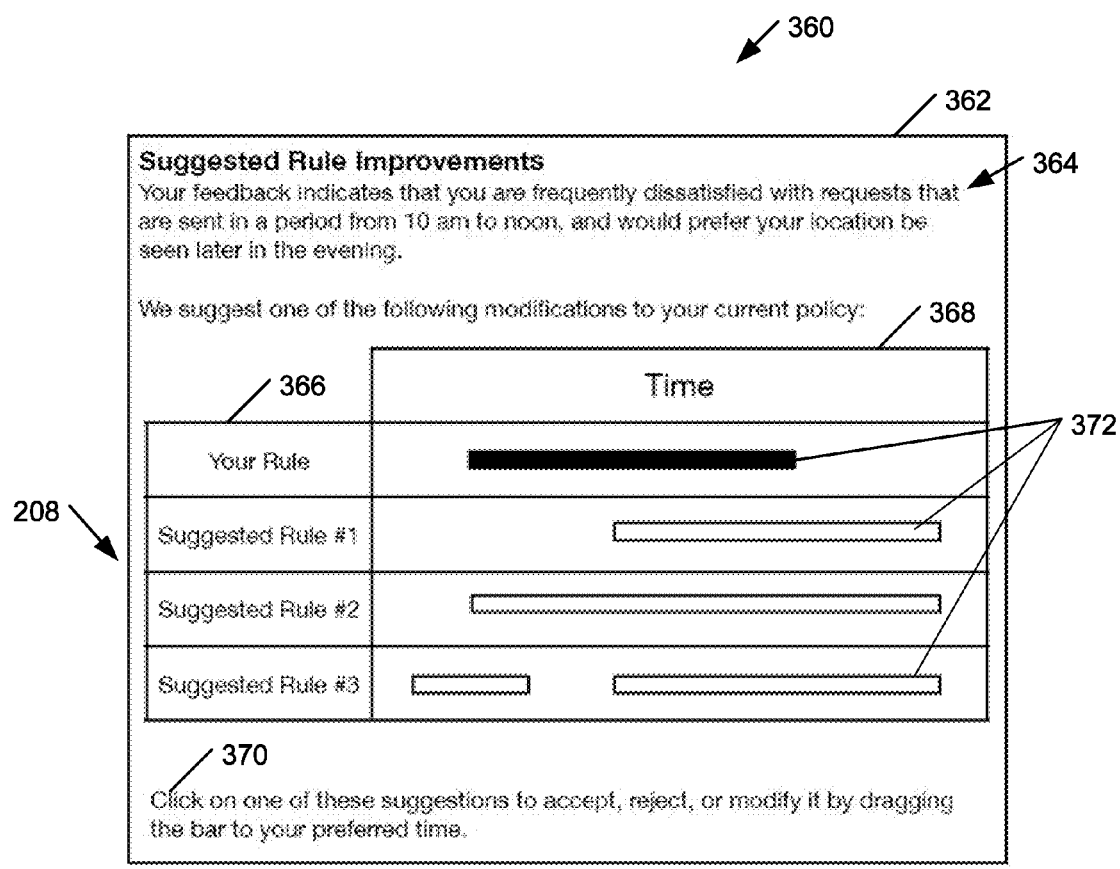
FIG. 7A illustrates one embodiment of a graphical user interface (GUI) as applied in the context of a location sharing application.

FIG. 7A illustrates one embodiment of a graphical user interface 360 as applied in the context of a location sharing application. With reference to FIGS. 1-2 and 7A, the interface 360 displays a screen 362 prompting 364 the user 190 with suggested rule improvements regarding the time of day during which requests sent to the user 190 will result in disclosure of location of the user 190. The existing rule is shown in a first portion 366 of the screen 362 and the time is shown in a second portion 368 of the screen 362. As shown, the PE module 140 provides three suggested policy modifications 208 to the rule for the user 190 to accept, reject, or modify by clicking 370 on one of the suggestions and dragging the bar 372 to one of the suggested times.

Figure 7B:
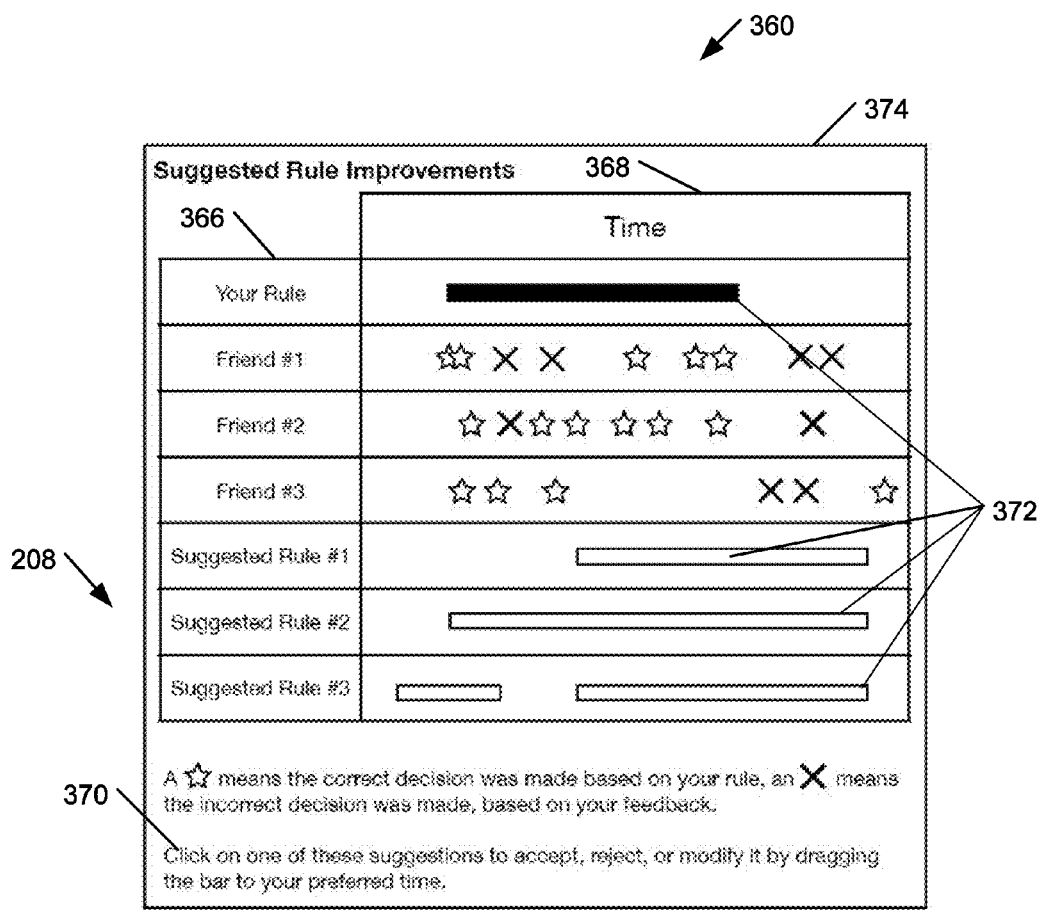
FIG. 7B illustrates one embodiment of a graphical user interface (GUI) as applied in the context of a location sharing application.

FIG. 7B illustrates one embodiment of a graphical user interface 360 as applied in the context of a location sharing application. With reference to FIGS. 1-2, 7A, and 7B the interface 360 displays a screen 374 prompting 364 the user 190 with suggested rule improvements regarding the time of day when requests for the user's 190 location will result in disclosure of that location. A summary of the user's 190 past feedback 204 is shown, illustrating past location requests from three friends and indicating the number of times a correct decision was made based on the user's 190 feedback as indicted by the "star" icon and the number of times the incorrect decision was made based on the user's 190 feedback 204 as indicated by the "X" icon. As shown, the PE module 140 provides three suggested policy modifications 208 to the rule for the user 190 to accept, reject, or modify by clicking 370 on one of the suggestions and dragging the bar 372 to one of the suggested times.

Figure 8:
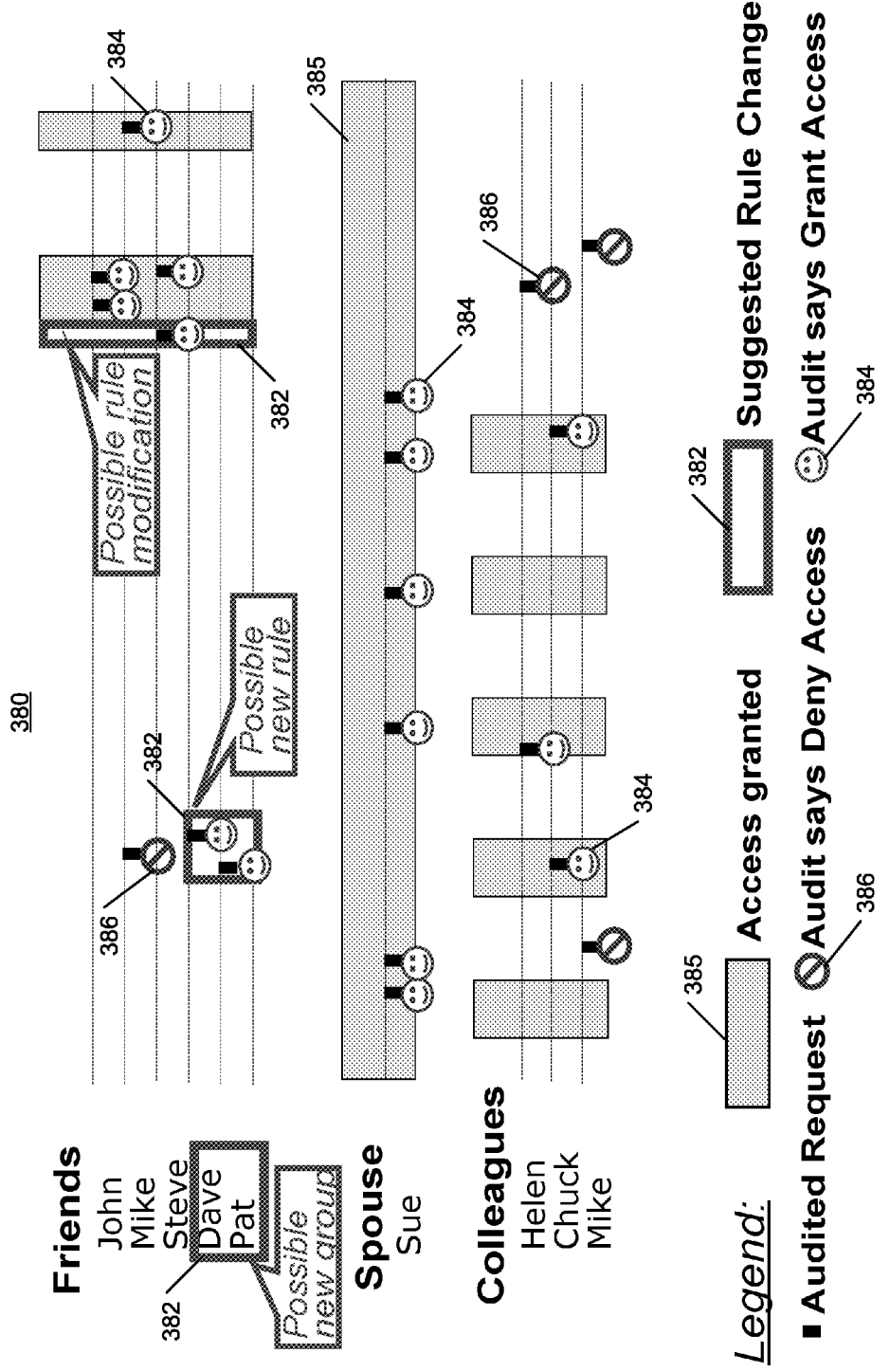
FIG. 8 illustrates one example a graphical user interface (GUI) that may be employed to present suggested policy modifications to the user and receive feedback therefrom.

FIG. 8 illustrates one example a graphical user interface 340 (GUI) that may be employed to present suggested policy modifications 208 to the user 190 and receive feedback 204 therefrom. The GUI 380 is implemented within a user-controllable policy learning system based on a location sharing application with which users can control when others can see their locations. With reference to FIGS. 1, 2, and 8, the graphical user interface 380 enables the user to interact with the policy system computer 110 with images rather than text commands. The GUI 380 provides graphical icons and visual indicators, as opposed to text-based interfaces, typed command labels, or text navigation to fully represent the information and actions available to the user 190. The actions are usually performed through direct manipulation of the graphical elements. The GUI 380 provides a purely graphical interface comprising a grid interface, which may or may not expandable, as desired for a given set of design parameters or performance constraints. By way of example, and not limitation, the illustrated GUI 380 enables the user to interact with the policy system computer 110 by presenting the suggested policy modification 208 to the user 190 in the form of graphical icons and visual indicators as well as colors to suggest possible changes for an access control type of interface policy.

As shown, FIG. 8 provides an illustration of incremental policy modification based on user feedback. With reference to FIGS. 1, 2, and 8, the policies 202 are expressed as rules granting access to a user's 190 location as indicated by boxes 385 with rule attributes including people or groups of people, day of the week, and time of the day. The smiling faces 384 denote location requests for which the user 190 is willing to disclose his location, and the "no entry" signs 386 denote requests for which the user 190 wishes no disclosure to be permitted. The policy system computer 110 gathers information on the user's 190 preferences as he or she audits (or gives feedback 204 on) actions taken by the policy system computer 110 on incoming requests. Policy errors correspond to the smiley faces 384 falling outside the boxes 382 (i.e., a location request should have been granted but was instead denied based on the current rules) and the "no-entry" signs 386 falling inside the boxes 382 (of which there are none in this particular example). Based on this feedback 204 and a discretized model of the policy 202 space, neighborhood search operators (e.g., extending a green time interval, shrinking a green time interval, splitting a green time interval in two, splitting a group of people) can be used to quickly generate a large number of incremental variations of the current policy 202. Each variation, which may be the result of applying one or more neighborhood search operators, depending on how the search is configured, can be evaluated based on its overall error, departure from the current policy 202 (to avoid incremental modifications that are too difficult for the user 190 to understand) and level of complexity/fragmentation (to avoid overfitting and to introduce a bias towards simpler policies). This can be done using an objective function defined as a weighted sum of different metrics as described in more detail below.

As previously discussed, any of the natural language or GUI interfaces 300, 360, 380 described with reference to FIGS. 3-8 may enable the user 190 to interact with the policy system computer 110 by presenting the suggested policy modifications 208 to the user 190 in a variety of contexts or applications. Accordingly, as previously discussed, these include, without limitation: data loss prevention applications, network firewalls, application level firewalls, intrusion detection systems, social networking applications, routing devices on the data networks, home networking devices such as routers, firewalls, and access points, recommender systems for products and services, software development environments for programming, debugging, and static analysis, email filtering applications, or SCADA systems, among others.

FIG. 9A illustrates one example of an abstract mathematical model of a policy 400 in terms of conditions/action rules.

The abstract policy 400 is one implementation of the policy 202 referred throughout this specification. FIG. 9B illustrates one instantiation of the abstract policy 400 in the context of a location sharing privacy application. The abstract policy 400 may be representative of any predetermined policies enforced by the policy system computer 110 and the PE module 140. The abstract policy 400 can be refined or instantiated as appropriate to enable the user 190 to control learning of policies in a variety of application domains. An example instantiation of this abstract policy is described hereinbelow with reference to FIGS. 13-16 in the context of a location sharing application.

With reference to FIGS. 1, 2, and 9, policies 202 may be viewed as condition/action rules that specify what actions should be taken under what circumstances. It is assumed that some set of actions "Action" can be restricted according to various criteria (e.g., the time of day or identities of users generating events), all of which are captured in the set "Restriction." A rule describes the restrictions under which a given set of actions may be executed. These restrictions may be defined as a logical conjunction: all must be fulfilled before the given actions may be taken. A rule thus may be defined as: Rule=P(Restriction)×P(Action), where we denote with P(S) the power set construction of set S. The policies 202 themselves may be represented by a set of such rules, connected by logical disjunction; thus, a policy 202 is simply a set of condition/action pairings, and we have Policy=P(Rule). With respect to the examples described with reference to FIGS. 9A, B, it is also assumed that policies 202 are consistent, in the sense that no rule or set of rules with non-disjoint premises entail actions that conflict with one another. It should be understood, however, that the described embodiments are not limited to such policies. Rather, any machine understandable computational policy that is a representation of rules that govern a computational agent's behavior is intended to fall within the scope of the described embodiments. A set of events is represented by the set "Event." Events are evaluated by a function "Evaluate," which compares an event to the appropriate policy 202 and executes either the actions specified within the rule or does nothing, modeled via the null action. As previously discussed, it is assumed that the users 190 have some means of providing feedback 204 on the suggested policy modifications 208 proposed by the PE module 140. The possible feedback 204 options are modeled via the set "Feedback," which could, for instance, be a binary "yes" or "no" or a numeric scale, or some sort of free response, that indicates user satisfaction. This model may be generalized to support feedback 204 in the form of an alternate set of actions that the user 190 would have preferred to the actions taken by the PE module 140 on behalf of the user 190. This audit data, for a given event R and the associated evaluation decision D, may be captured via an audit function Audit (R, D).

FIG. 10 illustrates one example of an abstract mathematic model of policy 202 transformation. With reference to FIGS. 1, 2, and 10, in one embodiment, the user-controllable learning process implemented by the policy system computer 110 achieves usability and encourages participation by the user 190 partly by ensuring that the suggested policy modifications 208 to a user's policy 202 are incremental, e.g., selected among a space or neighborhood of transformed policies that are close to the user's existing policy 202.

With reference now to FIGS. 1, 2, 9A, 9B, and 10, restrictions and actions, and by extension rules and policies 202, can be transformed in various ways, according to the specifics of the given policy enforcement system. A restriction that limits disclosure to a set of specified users 190, for instance, can be transformed via the deletion of one of the users 190 or the inclusion of a new one. For purposes of illustration, and not limitation, a restriction transformation function (Transform in FIG. 10) may be implemented by the PE module 140 to return a set of neighboring restrictions reachable from a given restriction by a single, incremental transition step however that might be defined in a refinement of the policy 202, for example. Similarly, an action transformation function (GenAction in FIG. 10) may be implemented by the PE module 140 to yield all incremental transformations of an action. These transformations may be extended to rules by implementing a rule generation function (GenRules in FIG. 10) by the PE module 140 to take the union of all possible transformations on the restrictions and/or actions within the rule and to eliminate one of those restrictions or actions or add an arbitrary new one. This transformation is further lifted to policies, as reflected in a neighborhood generation function (Neighbor in FIG. 10), which may be implemented by the PE module 140 to consider all possible rule transformations yielded by the rule generation function, and additionally allows for the deletion of an entire rule from the policy 202 or the addition of a new rule with no restrictions or actions, modeled as the addition of the empty rule (Ø, Ø) to the policy 202.

An objective function may be defined by which to evaluate each neighbor in order to select those that offer the greatest policy improvement. As discussed in more detail below, the PE module 140 ranks one or more potential variations to the policy 202 based on a score of an objective function for each potential variation. In one embodiment, the objective function comprises a plurality of function elements. The plurality of function elements comprises a user satisfaction function element and at least one other function element. In various other implementations, the objective function is formulated with respect to additional functional elements based on complexity, deviation, and diversity, either alone or in any combination with the user satisfaction function element.

In one embodiment, the potential variations to the policy 202 may comprise one or more neighboring policies. The neighboring policies alone or in combination may be evaluated by the PE module 140 in accordance with the objective function. One or more of the neighboring policies may be selected by the PE module 140 in accordance with the score provided by the objective function. Additionally, candidate sets of neighboring policies are evaluated according to a diversity metric in order to ensure that a meaningfully diverse set of suggested policy modifications 208 is presented to the user 190. It should be understood, that the diversity metric is evaluated not on individual policies but on the whole set or a subsets of the potential suggested policy modifications 208.

Accordingly, in one implementation, the user-controllable policy learning system employs neighborhood search techniques to explore incremental modifications of the user's 190 current policy 202. Neighboring policies can be generated using operators that incrementally modify a current policy (e.g., restricting or generalizing a rule, merging two or more rules). These neighboring policies can be rated based on how well they match the feedback 204 from the user 190 (i.e., favoring those that minimize error), how much they deviate from the current policy (e.g., penalizing deviations that are too great), and how fragmented they are (e.g., to avoid overfitting and favor those that are easier to understand). By rapidly searching the neighborhood associated with an existing model, it is possibly to quickly identify a small number of suggestions that can be presented to the user 190. These and other implementation details of the neighborhood search techniques in the context of the user-controllable policy learning system are described hereinbelow.

In various embodiments, the policy system computer 110 determines a plurality of metrics: (1) user satisfaction metric, (2) deviation metric, (3) complexity metric, and (4) diversity metric to evaluate a set of neighboring policies in order to ensure that a meaningfully diverse set of suggested policy modifications 208 is presented to the user 190. The objective function, defined as a weighted sum of these different metrics, generates a score, which is used by the policy system computer 110 to select neighboring policies that offer the greatest policy improvement. These metrics may be applied by the PE module 140 alone or in any combination to evaluate a set of suggested policy modifications 208.

In one embodiment, the objective function may be defined simply in terms of a user satisfaction metric. The user satisfaction metric can be determined by the PE module 140 based on the feedback 204 provided by the at least one user 190. In one implementation, the user satisfaction metric on which to score neighboring policies may be ascertained by determining the amount of negative feedback generated by the user 190. By way of example, and not limitation, the user satisfaction metric may be determined by minimizing the value of a function E on a policy P given a history of events R that also incorporates user feedback 204. Assuming a numeric scale of user feedback, where higher numeric values indicate lower satisfaction (e.g., 0 indicates highest user satisfaction), an objective function may be defined as the sum of Audit(r, Evaluate(P, r)) for all events r∈R. It will be appreciated, however, that maximizing user satisfaction does not protect against overfitting nor is it a guarantee of understandability or user satisfaction. Accordingly, additional metrics may be determined and evaluated by the policy system computer 110 as follows.

In addition, the objective function may be defined in accordance with a deviation metric. In one embodiment, the deviation metric determined by the PE module 140 measures by how much each of the one or more potential variations to a policy under consideration deviates from the policy 202 currently in force. In various embodiments, the deviation metric may be determined by the PE module 140 in accordance with one or more sub-function elements selected in accordance with a plurality of criteria such as, for example: (i) a function based on the number of individual variation steps required to transform the policy 202 currently in force into the potential policy variation under consideration, wherein variation steps are limited to variation steps that have been identified as easy to understand in a domain under consideration; (ii) a function that captures the effective difference between the potential policy variation under consideration and the policy 202 currently in force, when the policy specifies a finite number of decisions (i.e., the decisions that the potential policy variation would have made differently than the policy 202 currently in force); (iii) a function of user tolerance for deviation as collected through experiments with a representative set of users 190; (iv) a function of user tolerance for deviation as measured based on historical data comprising user feedback 204; and (v) a function based on the volumetric difference between the policy 202 currently in force and the potential policy variation under consideration when represented as geometric shapes in a multidimensional space, and (vi) domain-specific sub-function elements as appropriate for implementations of the method in practical application domains.

In one implementation, the deviation metric penalizes potential variations to a policy under consideration that result in the greatest deviation from the current policy 202, given that the suggested policy modifications 208 should be user-comprehensible. A penalty function may be implemented to assign a distance metric to two policies P and Q, $\Delta(P, Q)$, where $\Delta(P, P)=0$.

Another metric that may be employed to define the objective function is a complexity metric. In one embodiment, the complexity metric may be determined by the PE module 140 to measure how complex each of the one or more potential variations to a policy under consideration is. The complexity metric may be determined in accordance with one or more sub-function elements selected in accordance with a variety of criteria such as, for example: (i) a function of a number of rules comprising the policy 202; (ii) a function of a complexity of the rules based on attributes comprising any one of conditions, options, and actions associated with each rule; (iii) a function of complexity based on data collected through experiments with a representative set of users 190; (iv) a function of complexity based on historical data comprising user feedback 204; (v) a function based on patterns among the rules and patterns within individual rules, including entropy metrics; and (vi) domain-specific sub-function elements as appropriate for implementations of the method in practical application domains.

In one implementation, the complexity metric penalizes fine-granularity for the twofold purpose of preventing overfitting and giving precedence to less complex policies that are likely to be more readable by the user 190. By way of example, and not limitation, a complexity function may be implemented to assign a measure of complexity to a policy P, where 0 is the least complex. At the level of abstraction illustrated, for instance, in the abstract model of FIG. 9A, complexity criteria may be defined as the number of rules and the number of restrictions and actions per rule.

Yet another metric that may be employed to define the objective function is a diversity metric. The diversity metric may be determined by the PE module 140 to measure how diverse the set of potential variations to a policy under consideration is. The diversity metric may be determined in accordance with one or more sub-function elements selected in accordance with a plurality of criteria such as, for example: (i) a function based on the number and/or type of individual variation steps required to transform each of the one or more policy variations in the combination into any other policy variation in the combination; (ii) a function based on the number and/or type of individual variation steps required to transform the policy 202 currently in force into each of the policy modifications in a combination under consideration; (iii) a function of the entropy of the policy modifications in a combination under consideration; and (iv) domain-specific sub-function elements as appropriate for implementations of the method in practical application domains. In one implementation, the diversity metric can be calculated as the entropy of a set of potential policy variations encoded appropriately for the relevant practical application domain.

In one embodiment, the objective function may be defined as a weighted sum of two or more of the previously described metrics: (1) user satisfaction metric, (2) deviation metric, (3) complexity metric, and (4) diversity metric. In one implementation, the objective function may be defined as a weighted sum of the user satisfaction metric, deviation metric, complexity metric, and diversity metric to determine a general objective function (GOF) or score as follows:

$$GOF = \text{user satisfaction metric} + \text{deviation metric} + \text{complexity metric} + \text{diversity metric}.$$

In one implementation, penalty coefficients of $\gamma$, $\rho$, $\phi$, and $\sigma$ may be assigned for the function elements of user satisfaction, complexity, deviation, and diversity, respectively. Letting S be a set of potential suggested policy modifications, and letting P' be the user's 190 current policy 202 and R be a history of events, a general evaluation function may be defined for policies in this abstract as follows: $E(S, P', R) = \Sigma_{P \in S}(\gamma \Sigma_{r \in R} \text{Audit}(r, \text{Evaluate}(P, r)) + \rho \text{Complex}(P) + \phi \Delta(P, P')) + \text{Diversity}(S)$.

The above described policy evaluation framework can be refined as appropriate for specific applications and settings. For example, as discussed hereinbelow with respect to the location sharing example, location sharing policies are evaluated based on the number of negative audits they generate, and complexity is defined by the number of rules contained in a policy, the number of groups, users, and weekly patterns contained within those rules. Policy deviation is not here penalized explicitly. Rather, policy deviation is precluded above a certain threshold by restricting the number of transition steps allowed when generating the space of neighbors. The described embodiments, however, are not limited in this context.

In various embodiments, the policies described herein in connection with the described embodiments are not limited to policies that may be evaluated based on the application of individual rules (referred to hereafter as "one-step" policies). Rather, the policies described in connection with the described embodiments are intended to cover any and all possible computational policies, including those where multiple rules need to be sequentially evaluated to determine which action(s) to take. An example of a "one-step" policy is a policy where there is only a single layer of inference needed before determining what action(s) to take. In contrast, policies with multiple "layers of inference" may require the sequential firing of multiple rules before determining the next action. A simple example illustrating this concept might be the following multi-layer inference: "If X is my brother, then X is a family member," "If X is a family member, then X can see my location." A more complex example would be one where some rules just constrain the range of available options (e.g., "If X is a family member, then X can see my location," "If X is my brother, then X should not be able to see my location at a finer granularity than the city I am in."). It will be appreciated by those skilled in the art that the types of policies to be refined are not limited and there are many more complex examples, especially when one allows for negation, conflicts, and conflict resolution rules. The embodiments, however, are not limited in this context.

FIG. 11 illustrates one embodiment of a system 500 suitable for executing a computer implemented method for updating a policy 202 that is enforced by a computer program such as the PE module 140 executed by the policy system computer 110. The policy system computer 110 comprises at least one processor coupled to a memory/logic device 502. The memory/logic device 502 may comprise, without limitation, any memory circuit previously described and/or any type of logic circuit, whether or not programmable, such as a programmable gate array (PGA), field programmable gate array (FPGA), and the like. In one embodiment, the system 500 is suitable for implementing a process to control learning of policies in a variety of application domains. The system 500 is a simplified version of the general system 100 described in FIG. 1. Accordingly, for conciseness and clarity, not all system components or elements thereof are shown. Rather, the system 500 is provided to illustrate the policy learning functionality and interaction of the policy system computer 110, the PE module 140, and the client computer 120.

The client computer 120 comprises at least an output device such as the user interface 185 to enable the user 190 to interact with the policy system computer 110 and the PE module 140 using a variety of representations such as textual representation, audible representation, electronic Braille, and electrodes, and the like. In various embodiments, the user interface 185 may be implemented with any of the user interfaces previously described with reference to FIGS. 3-8, such as for example, the natural language interface 300, the GUIs 340 and 380, and/or any combinations thereof.

As previously discussed with reference to FIG. 1, the policy system computer 110 communicates with the client computer 120 through the network 150. The policy system computer 110 communicates to the user 190 one or more suggested modifications 208 made by the PE module 140 to the existing policy 202. The policy system computer 110 receives feedback 204 from the user 190 in response to the suggested modifications 208 proposed by the PE module 140.

Operations for the above systems 100, 200, 500 may be further described with reference to a logic flow. Although a particular logic flow is shown, it can be appreciated that the logic flow merely provides an example of how the general functionality described herein can be implemented within the systems 100, 200, 500 previously discussed. Further, the given logic flow does not necessarily have to be executed in the order presented unless otherwise indicated. In addition, the given logic flow may be implemented by a hardware element, a software or firmware element executed by a processor, or any combination thereof.

Figure 12:
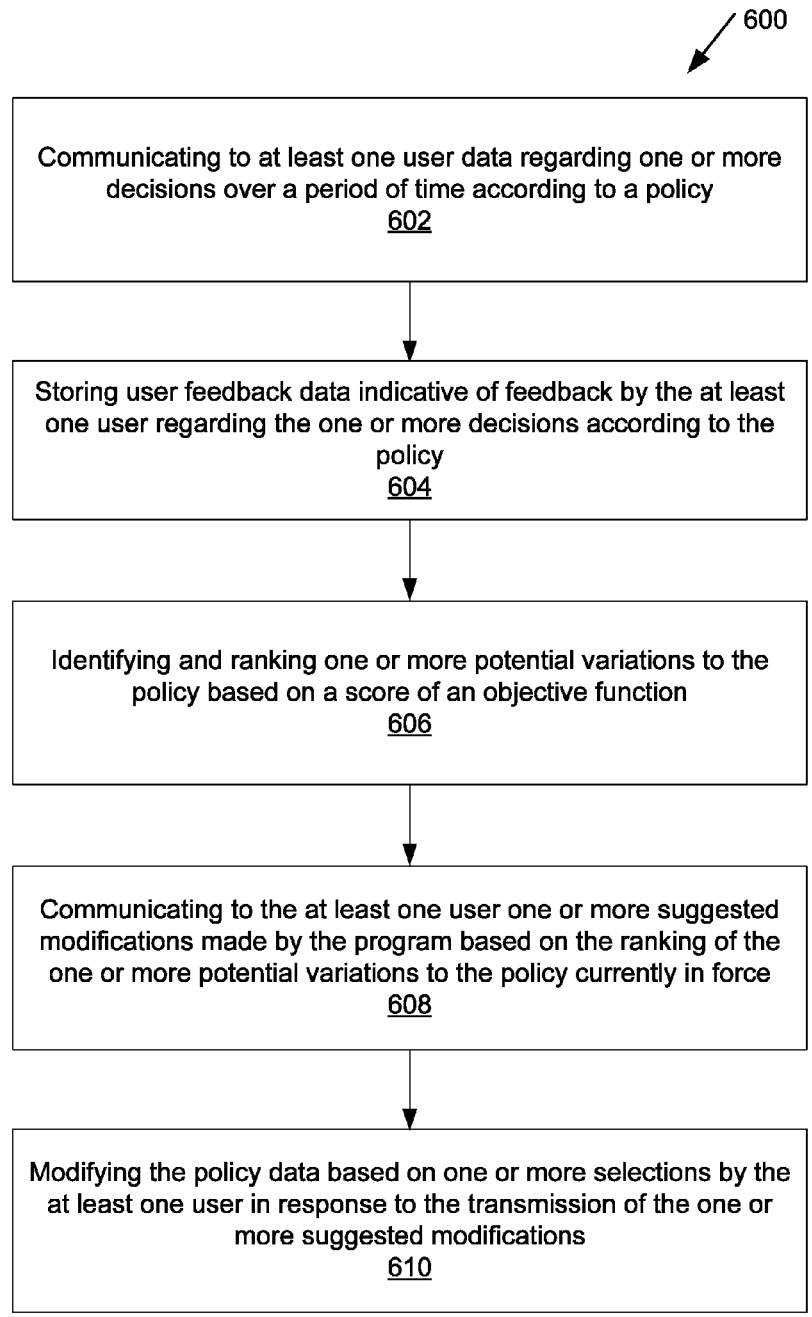
FIG. 12 illustrates one embodiment of a logic flow.

FIG. 12 illustrates one embodiment of a logic flow 600. The logic flow 600 may be representative of the operations executed by one or more systems 100, 200, 500 described herein, comprising the policy system computer 110 and the PE module 140, for example. The logic flow 600 illustrates one embodiment of a process that may be executed by the policy system computer 110 in accordance with the PE module 140. The policy system computer 110 and the PE module 140 may process information, such as, for example, to control learning of policies in a variety of application domains. Although the logic flow 600 may be executed by a variety of computing devices, for illustration purposes and not limitation, the logic flow 600 is described with respect to execution by the PE module 140 residing in the policy system computer 110. Accordingly, for conciseness and clarity, and not limitation, the logic flow 600 will be described in conjunction with the interaction and operation of the example system 500 described in FIG. 11.

In one embodiment, the logic flow 600 provides a computer implemented method for updating a policy that is enforced by a program such as the PE module 140 executed by the policy system computer 110. The policy system computer 110 comprises at least one processor coupled to the memory 502. At 602 the policy system computer 110 communicates to at least one user 190 data regarding one or more decisions made by the PE module 140 over a period of time according to a policy 202. Each decision is made by the PE module 140 on the particular policy in force at the time the decision is made. The policy data for the policy 202 is stored in a machine readable format in the memory 502 portion of or coupled to the policy system computer 110. The term user 190 includes any number of users including an end user, an administrator of the policy enforcing computer system, a person associated with specifying and modifying the policy, and the like.

At 604, user feedback data indicative of feedback 204 provided by the user 190 regarding the decisions made by the PE module 140 according to the policy 202 are stored in a machine readable format in the memory 502. In various embodiments, the feedback 204 from the user 190 may include explicit feedback or implicit feedback in regards to the policy decisions made by the PE module 140 according to the policy 202. In one implementation, the implicit feedback may be considered by the policy system computer 110 unless the user 190 provides explicit feedback. This may occur, for example, when the user 190 provides only partial feedback on the policy decisions. In the absence of explicit feedback from the user 190, the user satisfaction function element may apply different weights to the implicit feedback according to whether the implicit feedback is determined positively or negatively. The implicit feedback may be determined in accordance with one or more variables. By way of example, and not limitation, these variables include the relative recentness of the one or more decisions made by the PE module 140, what users 190 provided the feedback, and the roles played by the users 190. In yet another implementation, the implicit feedback may include feedback data calculated by interpolating between two or more feedback data for which the user 190 has provided feedback.

In one embodiment, a plurality of users 190 interact with the policy 202. Accordingly, at least one of the plurality of users 190 reviews the suggested modifications 208 to the policy 202. The user 190 then selects one or more of the suggested modifications to the policy 202 and provides feedback on the policy 202. The selecting, by the plurality of users, the one or more suggested modifications to the policy 202 may be based on a vote by the plurality of users 190.

At 606, the policy system computer 110 identifies and ranks one or more potential variations to the policy 202 based on a score of an objective function. The plurality of function elements comprises a user satisfaction function element and at least one other function element that measures the extent to which the one or more potential variations are likely to be understandable by the at least one user 190. In one embodiment, the plurality of function elements includes a function that measures a likelihood that the one or more policy variations will be understandable by the at least one user 190 based on measures of the complexity of the policy variations under consideration and measures of the deviation between the policy variation under consideration and the policy 202 currently in force. In one embodiment, the policy variations are made substantially understandable in accordance with the one or more function elements by limiting a complexity of the policy variations and restricting a deviation from the policy 202 currently in force. In one embodiment, the policy variations are made substantially understandable by collectively representing a meaningfully diversified set of options for the policy variations presented to the at least one user 190. In one embodiment, the plurality of function elements comprises a function that measures the diversity of the policy variations presented to the at least one user 190 with the objective of presenting the at least one user with a meaningfully diversified set of policy variations.

In one embodiment, the one or more potential variations to the policy 202 comprise one or more neighboring policies. The one or more neighboring policies alone or in combination may be evaluated by the PE module 140 in accordance with the objective function. One or more of the neighboring policies are selected by the policy system computer 110 in accordance with the score provided by the objective function. The objective function comprises a plurality of function elements, and the plurality of function elements comprises a user satisfaction function element and at least one other function element.

In one embodiment, identification and ranking of potential policy variations based on a score of an objective function at 606 includes applying a computational procedure to identify candidate variations and to score the identified candidate policy variations according to the objective function. The computational procedure may be a computational search procedure. Suitable computational search procedures may include, for example, a meta-heuristic search procedure (e.g., a simulated annealing search procedure, a genetic algorithm, a Tabu search procedure, a random optimization procedure, a swarm intelligence algorithm, an evolutionary algorithm), a local search procedure or neighborhood search procedure, a breadth-first search procedure, a depth-first search procedure, a best-first search computational procedure, a hill-climbing search procedure, a beam search procedure, an iterative improvement search procedure, an A * search procedure, a branch-and-bound search procedure. In another embodiment, the computational procedure may be any of an optimization algorithm, a non-deterministic computational procedure, a heuristic computational procedure and a computational learning procedure.

At 608, the policy system computer 110 communicates to the at least one user 190 one or more suggested modifications 208 made by the PE module 140 based on the ranking of the one or more potential variations to the policy 202 currently in force. The suggested modifications 208 provide transparency to the underlying mechanics (rules) of the policy 202 to enhance user understandability of the policy 202 and promote the at least one user 190 to provide feedback 204 in response to the communication. Although currently shown as a user interface 185 presented at the client computer 120, the communication of the suggested modifications 208 to the user 190 may be made in any suitable manner. By way of example and not limitation, the suggested modifications 208 may be communicated to the user 190 through any suitable visual representation, textual representation, audible representation, electronic Braille, electrodes, and the like.

At 610, the policy enforcement computer modifies the policy data stored in the memory 502 based on one or more selections by the user 190 in response to the transmission of the suggested modifications 208. In one embodiment, the suggested modifications 208 are applied by subject to acceptance by the user 190. In addition, the user 190 also may reject or modify the suggested modifications 208 in response to the communication thereof. In one embodiment, modifying comprises selecting any one of accepting, rejecting, and modifying the one or more suggestions by the at least one user. In one embodiment, the at least one user 190 can initiate a modification independently of any of the suggested modifications.

As previously discussed, the objective function comprises a plurality of function elements, and the plurality of function elements comprises a user satisfaction function element and at least one other function element. The at least one other function element comprises a deviation function element, a complexity function element, and a diversity function element. In one embodiment, the PE module 140 determines at least user satisfaction metric based on the feedback 204 provided by the at least one user 190 to the PE module 140.

In one embodiment, the PE module 140 determines a deviation metric that measures by how much each of the one or more potential variations to a policy under consideration deviates from the policy 202 currently in force. In one embodiment, the deviation metric may be determined by the PE module 140 in accordance with one or more sub-function elements selected in accordance with a plurality of criteria such as, for example: (i) a function based on the number of individual variation steps required to transform the policy 202 currently in force into the potential policy variation under consideration, wherein variation steps are limited to variation steps that have been identified as easy to understand in a domain under consideration; (ii) a function that captures the effective difference between the potential policy variation under consideration and the policy 202 currently in force, when the policy specifies a finite number of decisions (i.e., the decisions that the potential policy variation would have made differently than the policy 202 currently in force); (iii) a function of user tolerance for deviation as collected through experiments with a representative set of users 190; (iv) a function of user tolerance for deviation as measured based on historical data comprising user feedback 204; and (v) a function based on the volumetric difference between the policy 202 currently in force and the potential policy variation under consideration when represented as geometric shapes in a multidimensional space, and (vi) domain-specific sub-function elements as appropriate for implementations of the method in practical application domains.

In one embodiment, the PE module 140 determines a complexity metric that measures how complex each of the one or more potential variations to a policy under consideration is. The complexity metric may be determined in accordance with one or more sub-function elements selected in accordance with a variety of criteria such as, for example: (i) a function of a number of rules comprising the policy 202; (ii) a function of a complexity of the rules based on attributes comprising any one of conditions, options, and actions associated with each rule; (iii) a function of complexity based on data collected through experiments with a representative set of users 190; (iv) a function of complexity based on historical data comprising user feedback 204; (v) a function based on patterns among the rules and patterns within individual rules; and (vi) domain- specific sub-function elements as appropriate for implementations of the method in concrete application domains.

In one embodiment, the PE module 140 evaluates the set of one or more suggested modifications 208 according to a diversity function element to determine a diversity metric. The diversity metric measures how diverse the set of one or more potential variations to the policy under consideration is. The diversity metric may be determined in accordance with one or more sub-function elements selected in accordance with a plurality of criteria such as, for example: (i) a function based on the number or type of individual variation steps required to transform each of the one or more sub-function element; (ii) a function based on the number or type of individual variation steps required to transform the policy 202 currently in force into each of the policy modifications in a combination under consideration; (iii) a function of the entropy of the policy modifications in a combination under consideration; and (iv) domain-specific sub-function elements as appropriate for implementations of the method in concrete application domains.

In one embodiment, the objective function comprises a general policy evaluation function comprising at least the user satisfaction metric function element. The general policy evaluation function also comprises a deviation function element to determine by how much each of the one or more potential variations to a policy under consideration deviates from the policy currently in force. The general policy evaluation function also comprises a complexity function element to determine how complex each of the one or more potential variations to a policy under consideration is. The general policy evaluation function also comprises a diversity function element to determine how diverse the set of one or more potential variations to the policy under consideration is. In one embodiment, the policy system computer 110 determines a general objective function (GOF) by any combination of the user satisfaction metric element according to the following combination:

GOF=user satisfaction metric+deviation metric+complexity metric+diversity metric.

In yet another embodiment, the objective function comprises a policy evaluation function comprising at least the user satisfaction function element based on the feedback 204 provided by the at least one user 190. The objective function also comprises a combination of any one of a deviation function element to determine by how much each of the one or more potential variations to a policy under consideration deviates from the policy currently in force 202, a complexity function element to determine how complex each of the one or more potential variations to a policy under consideration is, and a diversity function element to determine how diverse the one or more potential variations to the policy under consideration is.

Figure 13:
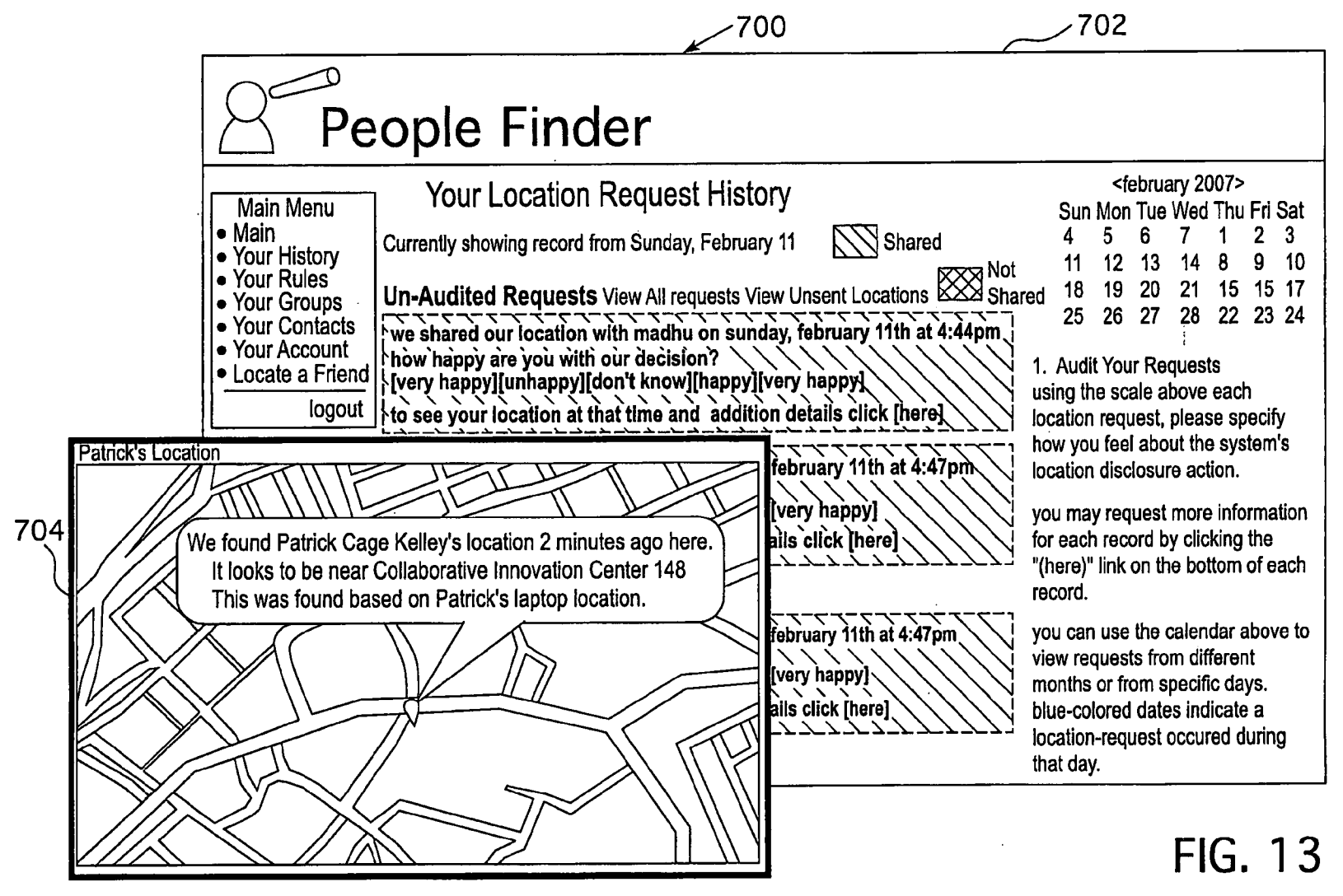

While the embodiments have been described generally above, a location sharing example is now described with reference to FIGS. 13-16 for illustrative purposes. The location sharing example is based on the PeopleFinder location-based social network application (PeopleFinder Application) developed at the Mobile Commerce Lab at Carnegie Mellon University, screenshot 700 of which is shown in FIG. 13. The PeopleFinder Application allows users 190 (FIG. 1) of location-enabled laptops and cell phones to share their location with their network of friends in a privacy-sensitive way. Privacy policies 202 (FIG. 1) in the PeopleFinder Application permit disclosure based on three criteria: the identity (or group membership) of the user making the request, the weekday and time of the request, and the location of the requested user 190. Thus, privacy policies 202 can be comprised of rules such as "Allow disclosure to the group Co-Workers on weekdays between 9 and 5, but only when I am actually at my office." In addition, users 190 of the PeopleFinder Application can provide feedback 204 (FIG. 2) on system decisions. The background window 702 illustrates the feedback interface, whereby users 190 can review a history of requests for their location and indicate their level of satisfaction with the disclosure decisions made by the system. Users 190 can also ask for additional details about the requests and obtain explanations of the system's actions: for instance, what policy rule applied to allow disclosure of the user's 190 location, or why a request was denied.

The PeopleFinder Application has been deployed in numerous field studies involving over 100 total users 190. Detailed log data collected during these deployments form one basis for validation experiments discussed in the subsequent description. These data also illustrate why the PeopleFinder Application is a suitable example on which to validate the framework: first and foremost, users of the PeopleFinder Application have demonstrated the usual difficulty specifying their privacy policies 202 by hand, achieving an average initial accuracy of 60%, and are thus prime candidates for a support system in accordance with the described embodiments.

Furthermore, the observed user behavior indicates that, when attempting to improve their policies 202 by hand, users 190 generally make small, incremental changes. As will be shown the space of neighboring policies is vast. Therefore, those skilled in the art will appreciate that the learning system in accordance with the described embodiments, which can sample a larger subspace of neighbors than the user could realistically hope to, will assist users 190 in selecting the best incremental change to their policies 202.

FIG. 9B illustrates an instantiation of the abstract formal policy model of FIG. 9A appropriate for a location sharing application. FIG. 9B shows one instantiation suitable for the location sharing application to further illustrate the user-controllable policy learning system in accordance with the described embodiments. For the sake of conciseness and clarity, this example ignores restrictions based on locations. Nevertheless, extending this example to incorporate such restrictions is within the ability of one skilled in the art. The restrictions incorporated in these policies 202 take three forms: either a WeeklyPattern, which describes a time span valid on a set of weekdays, an individual user from set User representing a friend in the user's social network, or a group of users from set Group. In accordance with the described embodiments of the user-controllable policy learning system, the possible actions are disclosure of a user location or rejection of a request, Action={Disclose; Withhold}, though we note that disclosure decisions need not always be binary. Returning an obfuscated version of the data requested is a strategy often employed in privacy-sensitive applications, thus one possible disclosure decision could be to return a downgraded version of the data requested. In the PeopleFinder Application, the options for user feedback are also binary, Feedback={0; 1}. In accordance with one convention, described above, that policies with minimal scores are most desirable, we let 0 indicates user satisfaction, and 1 user dissatisfaction. This refinement of the given model suffices to describe the policies 202 within the PeopleFinder Application.

We now turn to an instantiation of the user-controllable policy learning system for incremental policy refinement in the context of the PeopleFinder Application previously introduced above. Accordingly, a simple neighborhood search implementation of the user-controllable policy learning system according to the described embodiments, will be described in the context of the PeopleFinder Application. The performance is based on simulated scenarios based on data derived from experimental deployments of the PeopleFinder Application system and compared with the performance achieved by users who manually modified their policies during the course of these deployments.

Figure 14:
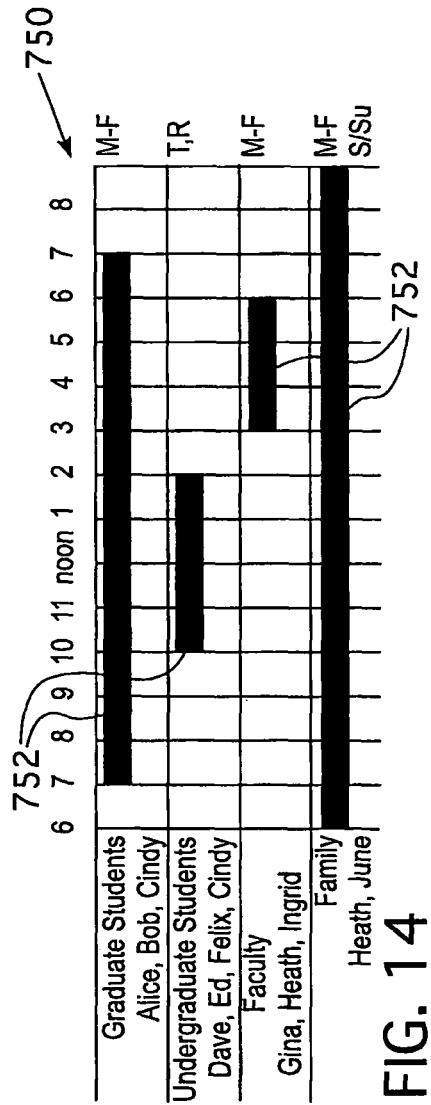
FIG. 14 shows a graphical representation of a simple location sharing application policy with ten contacts organized into four groups.

FIG. 14 shows a graphical representation of a simple location sharing application policy 750 with ten contacts organized into four groups (with some overlap, specifically Cindy and Heath). Black bars 752 indicate times when disclosure is permitted—to the groups named on the left, on the weekdays listed on the right. Only the group "Family" has access to the user's location all the time, every day.

As previously discussed, one implementation of the user-controllable policy learning system in accordance with the described embodiments involves using neighborhood search to explore incremental modifications of the user's current policy. These modifications can be generated using transformation operators that are selected to cover a meaningful set of easy-to-understand modifications to the user's 190 current policy 202. Results presented below assume the following set of policy transformation operators: (1) the deletion of an existing rule, or the addition of a new rule permitting disclosure to a given user during a given time span on a given day; (2) the expansion or contraction of either the start or end of a time-span by up to an hour; (3) the deletion of a day from a duration within a rule, or the addition of a day to a rule duration; and the addition of a person to a group, or the deletion of a person from a group.

In the results provided below, suggestions were selected by randomly generating and evaluating a large number of neighbors of the user's 190 current policy 202. Although each neighbor was equally likely to be selected, those skilled in the art will appreciate that more sophisticated implementations that could assign different probabilities to different operators are clearly within the scope of the described embodiments. Experiments were also conducted with instantiations that varied based on the number of neighbors generated for a given policy as well as the number of successive moves (or policy transformations) allowed at each step. Intuitively, several successive moves allow the procedure to explore a wider, more diverse neighborhood, though at the risk of suggesting policy modifications that are more difficult for the user 190 to understand. Accordingly, the sensitivity of the experiment to variations in these parameter values was evaluated to determine to what extent a very limited number of moves (e.g., just one policy transformation) might be sufficient to generate suggestions that would yield meaningful improvements in accuracy.

Each time the user-controllable learning process in accordance with the described embodiments is invoked, it generates and evaluates a number of policy modifications (based on user satisfaction, complexity, and deviation from the current policy) and uses the top rated transformations to suggest possible policy modifications to the user 190. The following experimental results were limited to generating a single suggestion each time, namely the policy transformation with the highest score among all those generated by the neighborhood search procedure. The described embodiments, however, are not limited in this context.

To validate the user-controllable learning process in accordance with the described embodiments, data derived from experimental campus deployments of the PeopleFinder Application was used. These deployments, which spanned between 1 and 8 weeks, involved a total of over 100 participants. The pilots, which confirmed that the users 190 often have great difficulty articulating their policies 202, also provided a baseline against which we were able to compare the performance of the user-controllable policy learning algorithms in accordance with the described embodiments. Specifically, detailed logs collected during the deployments of the PeopleFinder Application were used to characterize the complexity of initial policies 202 defined by the users 190, the average number of daily requests users received, and the frequency with which the users 190 revise these policies 202. This information was, in turn, used (1) to simulate a large number of scenarios representative of user behavior observed during our deployments and (2) to extrapolate plausible usage scenarios for the user-controllable policy learning process. In the experiments reported herein, the results from a first set of these scenarios are presented in which the users 190 received an average of five location requests per day, audited and revised their policies every other day, with policy revision limited to a single policy modification. Assuming this level of usage, the results on policy improvement are reported based on the number of weeks using the system. It is further assumed that the modification selected by the user 190 was the top ranked suggestion generated by the neighborhood search implementation of the user-controllable policy learning algorithm, using all previously audited data.

Figure 15:
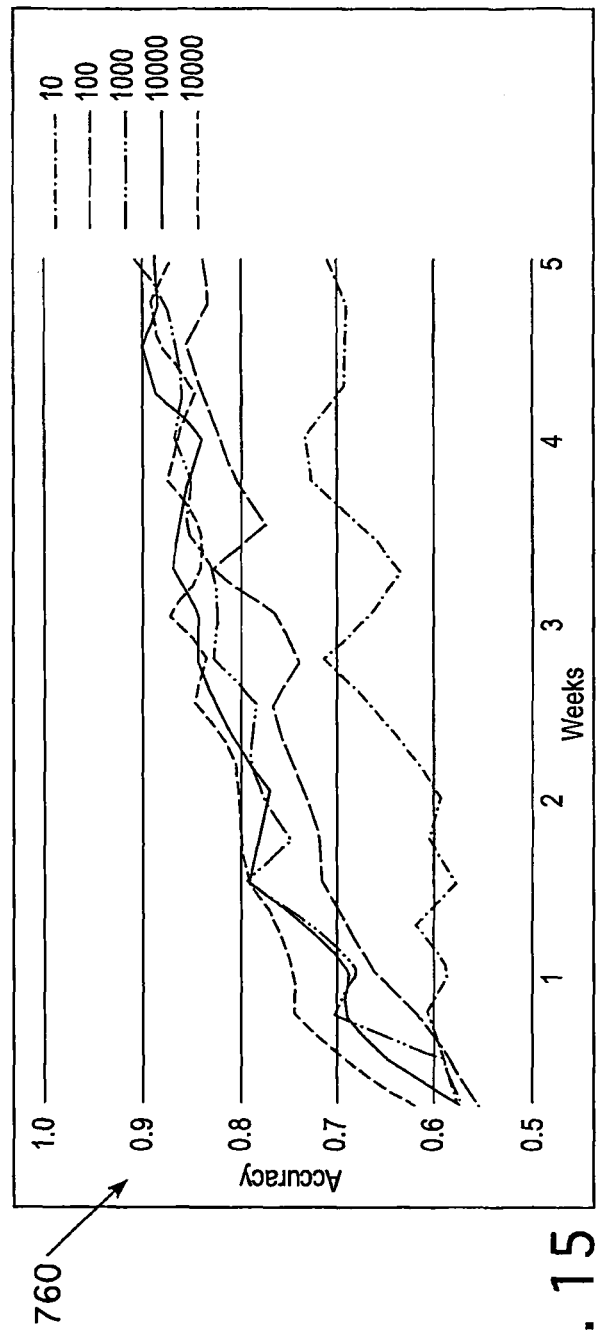
FIG. 15 is a graphical representation showing the sensitivity of one embodiment of a user-controllable policy learning algorithm to the number of neighbors generated.

FIG. 15 is a graphical representation 760 showing the sensitivity of one embodiment of a user-controllable policy learning algorithm to the number of neighbors generated. As can be seen, a value of 1,000 neighbors was generally sufficient to provide for fairly rapid improvements in accuracy and greater values did not significantly increase performance.

Figure 16:
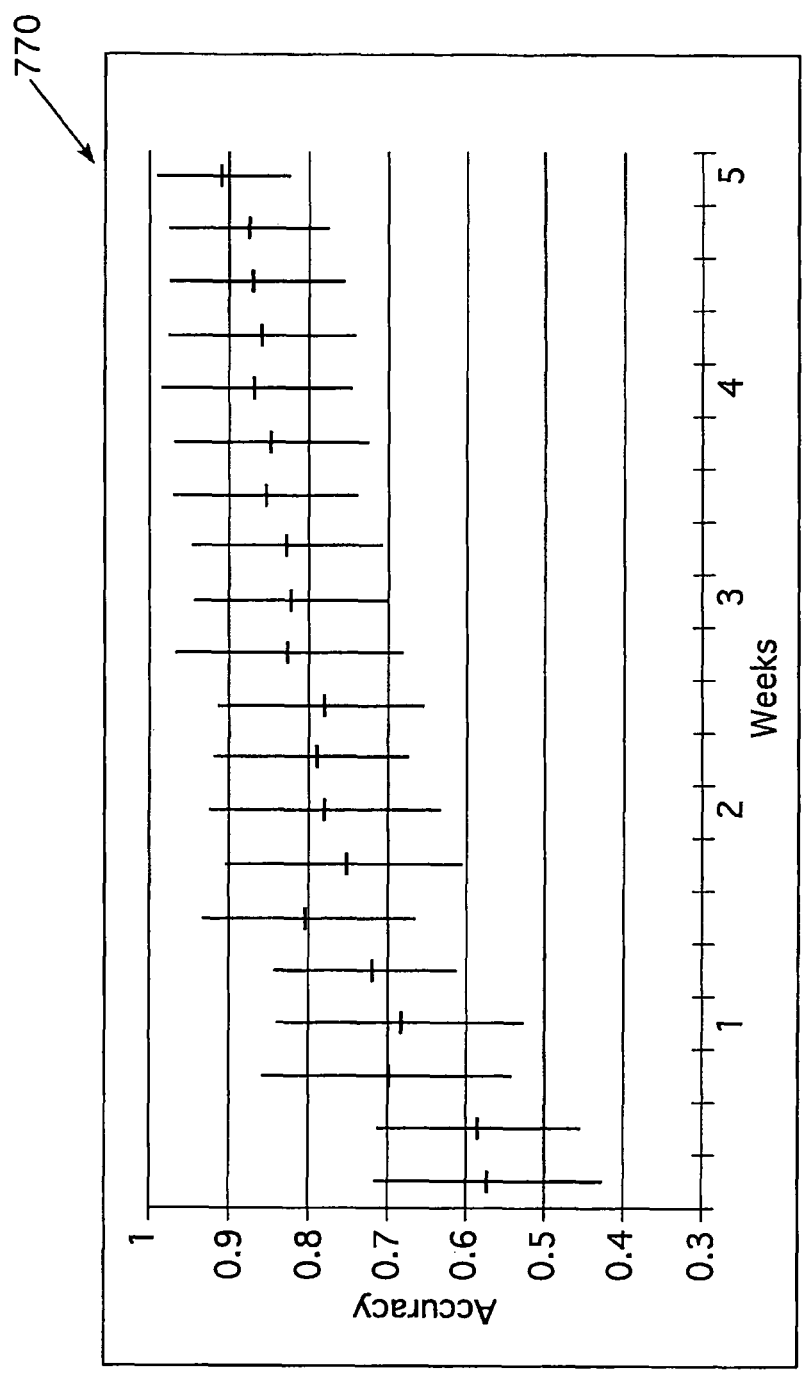
FIG. 16 is a graphical representation showing average accuracy with standard deviations across fifty runs of our simulation.

FIG. 16 is a graphical representation 770 showing average accuracy with standard deviations across fifty runs of our simulation. It can be seen that while, early on, the system is only predicting on average about six incoming decisions correctly out of ten (which is consistent with the accuracy of policies defined by users in actual deployments of the PeopleFinder Application), after about two weeks, accuracy reaches about 80% and even climbs to about 90% if given an extra two to three weeks. In comparison, the accuracy of policies refined manually by the PeopleFinder Application users reached a plateau at around 79%. While a strict comparison between these two numbers would be inappropriate, these results suggest that incremental policy learning in accordance with the described embodiments can likely help users 190 define more accurate policies. Experiments in which the neighborhood search procedure was allowed to explore multiple consecutive policy transformations provided for slightly faster convergence, though at the expense of higher computational overhead and with the drawback of generating suggestions that are likely more difficult for users to understand. Accordingly, even with the large number of parameters controlled above, it can been shown that with small numbers of audited requests per week, within the range of our earlier field studies, suggestions can be generated that, if taken, would significantly increase policy accuracy. These results show that making policies change only in user-understandable increments based on our neighborhood search should help users bring their policies to convergence more quickly than without aid.

FIG. 17 and the following discussion are intended to provide a brief general description of a suitable computing environment in which the described embodiments of the computers $110_{1-n}$ and $120_{1-m}$ may be implemented. It should be understood, however, that handheld, portable, and other computing devices and computing objects of all kinds are contemplated for use in connection with the described embodiments. FIG. 17 illustrates one example of a suitable computing system environment 1000 in which the described embodiments may be implemented. Although as made clear above, the computing system environment 1000 is only one example of a suitable computing environment and is not intended to suggest any limitation as to the scope of use or functionality of the described embodiments. Neither should the computing environment 1000 be interpreted as having any dependency or requirement relating to any one or combination of components illustrated in the operating computing environment 1000. With reference to FIG. 17, one embodiment of a system for implementing the described embodiments comprises a general purpose computing device in the form of a computer system 1100. Components of the computer system 1100 may comprise a processing unit 1200, a system memory 1300, and a system bus 1210 that couples various system components including the system memory to the processing unit 1200. The system bus 1210 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer system 1100 generally comprises a variety of computer readable media. Computer readable media can be any available media that can be accessed by the computer system 1100 and includes both volatile and nonvolatile media, removable, and non-removable media. Computer storage media includes volatile and nonvolatile, removable, and non-removable media implemented in any method or technology for storage of information such as computer readable instructions, data structures, program modules, or other data. Computer storage media includes, but is not limited to, Random Access Memory (RAM), Dynamic RAM (DRAM), Double-Data-Rate DRAM (DDRAM), Synchronous DRAM (SDRAM), Static RAM (SRAM), Programmable ROM (PROM), Read Only Memory (ROM), Electrically Erasable Programmable Read Only Memory (EEPROM), flash memory, polymer memory such as ferroelectric polymer memory, ovonic memory, phase change or ferroelectric memory, silicon-oxide- nitride-oxide-silicon (SONOS) memory, Compact Disk Read Only Memory (CDROM), Compact Disc-rewritable (CDRW) Digital Versatile Disks (DVD) or other optical disk storage, magnetic cassettes, magnetic tape, magnetic disk storage or other magnetic storage devices, or any other medium which can be used to store the desired information and which can accessed by the computer system 1100. It is worthy to note that some portion or the entire computer storage medium may be included in other elements of the apparatus computer system 1100. For instance, some or all of computer storage medium may be included on a same integrated circuit or chip with elements of the computer system 1100 (e.g., processing unit 1200). Alternatively, some portion or the entire computer storage medium may be disposed on an integrated circuit or other medium (e.g., a hard disk drive) that is external. Communication media typically embodies computer readable instructions, data structures, program modules or other data in a modulated data signal such as a carrier wave or other transport mechanism and includes any information delivery media. The term "modulated data signal" means a signal that has one or more of its characteristics set or modified in such a manner as to encode information in the signal. By way of example, and not limitation, communication media includes wired media such as a wired network or direct-wired connection, and wireless media such as acoustic, RF, infrared, and other wireless media. The embodiments are not limited in this context.

The system memory 1300 includes computer storage media in the form of volatile and/or nonvolatile memory such as ROM 1310 and RAM 1320. A basic input/output system 1330 (BIOS), containing the basic routines that help to transfer information between elements within the computer system 1100, such as during start-up, is typically stored in the ROM 1310. The RAM 1320 typically contains data and/or program modules that are immediately accessible to and/or presently being operated on by the processing unit 1200. By way of example, and not limitation, FIG. 17 illustrates an operating system 1340, one or more application programs 1350, other program modules 1360, program data 1370. As previously discussed, the PE module 140 may comprise embedded applications implemented as firmware, software, hardware or any combination thereof. Accordingly, the other program modules 1360 may comprise software instructions to implement the PE module 140. Alternatively, the PE module 140, which is shown in phantom to indicate that it may be implemented as hardware, software, or firmware, may reside within the computer system 1100.

The computer system 1100 also may comprise other removable/non-removable, volatile/nonvolatile computer storage media. By way of example only, FIG. 17 illustrates a hard disk drive 1410 that reads from or writes to non-removable, nonvolatile magnetic media, a magnetic disk drive 1510 that reads from or writes to a removable, nonvolatile magnetic disk 1520, and an optical disk drive 1550 that reads from or writes to a removable, nonvolatile optical disk 1560, such as a CD ROM, CDRW or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1410 is typically connected to the system bus 1210 through a non-removable memory interface such as interface 1400, and magnetic disk drive 1510 and optical disk drive 1550 are typically connected to the system bus 1210 by a removable memory interface, such as interface 1500.

The drives and their associated computer storage media discussed above and illustrated in FIG. 17 provide storage of computer readable instructions, data structures, program modules, and other data for the computer system 1100. In FIG. 17, for example, the hard disk drive 1410 is illustrated as storing an operating system 1440, one or more application programs 1450, other program modules 1460, and program data 1470. Note that these components can either be the same as or different from the operating system 1340, the one or more application programs 1350, the other program modules 1360, and the program data 1370. The operating system 1440, the one or more application programs 1450, the other program modules 1460, and the program data 1470 are given different numbers here to illustrate that, at a minimum, they are different copies. A user may enter commands and information into the computer system 1100 through input devices such as a keyboard 1620 and pointing device 1610, commonly referred to as a mouse, trackball, or touch pad, and a scanner 1490. Other input devices (not shown) may include a microphone, joystick, game pad, satellite dish, or the like. These and other input devices are often connected to the processing unit 1200 through a user input interface 1600 that is coupled to the system bus 1210, but may be connected by other interface and bus structures, such as a parallel port, game port or a universal serial bus (USB). A display device 1910 or other type of display device is also connected to the system bus 1210 via an interface, such as a video interface 1900, which may in turn communicates with video memory (not shown). In addition to the display device 1910, computer systems also may include other peripheral output devices such as speakers 1970 and a printer 1960, which may be connected through an output peripheral interface 1950.

The computer system 1100 may operate in a networked or distributed environment using logical connections to one or more remote computers, such as a remote computer 1800. The remote computer 1800 may be a personal computer, a server, a router, a network PC, a peer device or other common network node, and typically includes many or all of the elements described above relative to the computer system 1100, although only a memory storage device 1810 has been illustrated in FIG. 17. The logical connections depicted in FIG. 17 include a local area network (LAN) 1710 and a wide area network (WAN) 1730, but may also include other networks/buses. Such networking environments are commonplace in homes, offices, enterprise-wide computer networks, intranets, and the Internet.

When used in a LAN networking environment, the computer system 1100 is connected to the LAN 1710 through a network interface or adapter 1700. When used in a WAN networking environment, the computer system 1100 generally includes a modem 1720 or other means for establishing communications over the WAN 1730, such as the Internet. The modem 1720, which may be internal or external, may be connected to the system bus 1210 via the user input interface 1600, or other appropriate mechanism. In a networked environment, program modules depicted relative to the computer system 1100, or portions thereof, may be stored in the remote memory storage device. By way of example, and not limitation, FIG. 17 illustrates one or more remote application programs 1850 as residing on the memory device 1810. It will be appreciated that the network connections shown are non limiting examples and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, the MICROSOFT® .NET platform includes servers, building-block services, such as Web-based data storage and downloadable device software. While the embodiments described herein in connection with software residing on a computing device, one or more portions of the described embodiments also may be implemented via an operating system, application programming interface (API) or a "middle man" object between any of a coprocessor, a display device, and a requesting object, such that operation according to the described embodiments may be performed by, supported in, or accessed via all of .NET's languages and services, and in other distributed computing frameworks as well.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

The invention claimed is:

1. A computer implemented method for allowing at least one user to control updates to an existing policy that is enforced by a computer program, the method comprising:
   communicating, by a computer system to the at least one user, data regarding one or more decisions made by the program according to one or more versions of the policy, wherein policy data for the policy is stored in a machine readable format in a memory coupled to the computer system, wherein the computer system comprises at least one processor coupled to a memory;
   storing in a machine readable format user feedback data indicative of feedback by the at least one user regarding the one or more decisions made by the program according to the policy;
   determining, by the computer system, based on the user feedback data regarding the one or more decisions made by the program, one or more potential variations to the existing policy using a neighborhood procedure, wherein the one or more potential variations are generated using neighborhood operators;
   ranking, by the computer system, the one or more potential variations to the existing policy based on a score of an objective function, wherein the objective function comprises a plurality of function elements, wherein the plurality of function elements comprises a user satisfaction function element and at least one other function element that comprises a quantitative measure of understandability of the one or more potential variations to the existing policy for the at least one user that measures an extent to which the one or more potential variations are likely to be understandable by the at least one user;
   communicating, by the computer system to the at least one user, one or more suggested modifications to the existing policy based on the ranking of the one or more potential variations to the existing policy, wherein the one or more suggested modifications can assist the one or more users refine the existing policy;

receiving, by the computer system, one or more selections from the user that are responsive to the one or more suggested modifications to the existing policy communicated to the at least one user; and modifying, by the computer system, the policy data stored in the memory based on the one or more selections by the at least one user in response to the communication of the one or more suggested modifications to the at least one user to generate an updated policy for the at least one user.

2. The method of claim 1, wherein the at least one other function element that comprises a quantitative measure of understandability of the one or more potential variations to the existing policy for the at least one user comprises:
   a quantitative measure of the complexity of the policy variations under consideration; and
   a quantitative measure of the deviation between the policy variation under consideration and the policy currently in force.

3. The method of claim 2, wherein the at least one other function element that comprises a quantitative measure of understandability of the one or more potential variations to the existing policy for the at least one user additionally comprises a quantitative measure of the diversity of the policy variations presented to the at least one user with the objective of presenting the at least one user with a meaningfully diversified set of policy variations.

4. The method of claim 3, comprising:
   determining a diversity metric that is the quantitative measure of how diverse a combination of the one or more potential variations to the policy under consideration is; and
   evaluating the one or more suggested modifications according to the diversity metric.

5. The method of claim 4, comprising determining the diversity metric of a combination of policy variations in accordance with one or more sub-function elements, wherein the sub-function elements are selected from the group consisting of:
   (i) a function based on the number and/or type of individual variation steps required to transform each of the one or more policy variations in the combination into any other policy variation in the combination;
   (ii) a function based on the number and/or type of individual variation steps required to transform the policy currently in force into each of the policy modifications in a combination under consideration;
   (iii) a function of the entropy of the policy modifications in a combination under consideration; and
   (iv) domain-specific sub-function elements.

6. The method of claim 1, wherein a selection made by the at least one user when presented with the one or more policy variations includes accepting, rejecting and modifying the one or more policy variations.

7. The method of claim 1, wherein modifying, by the computer system, the policy data stored in the memory can be initiated by the at least one user independently of any suggested modifications.

8. The method of claim 1, comprising:
   evaluating the one or more policy variations alone or in combination in accordance with the objective function; and
   selecting the one or more policy variations in accordance with the score provided by the objective function.

9. The method of claim 1, comprising determining a user satisfaction metric based on the feedback by the at least one user.

10. The method of claim 1, wherein the at least one other function element that comprises a quantitative measure of understandability of the one or more potential variations to the existing policy for the at least one user comprises a quantitative measure of the deviation between the policy variation under consideration and the existing policy currently in force.

11. The method of claim 10, comprising determining a deviation metric that is the quantitative measure of how much each of the one or more potential variations to a policy under consideration deviates from the existing policy currently in force.

12. The method of claim 11, comprising determining the deviation metric in accordance with one or more sub-function elements, wherein the sub-function elements are selected from the group consisting of:
   (i) a function based on the number of individual variation steps required to transform the existing policy currently in force into the potential policy variation under consideration, wherein variation steps are limited to variation steps that have been identified as easy to understand in a domain under consideration;
   (ii) a function that captures the effective difference between the potential policy variation under consideration and the existing policy currently in force, when the policy specifies a finite number of decisions;
   (iii) a function of user tolerance for deviation as collected through experiments with a representative set of users;
   (iv) a function of user tolerance for deviation as measured based on historical data comprising user feedback; and
   (v) a function based on the volumetric difference between the existing policy currently in force and the potential policy variation under consideration when represented as geometric shapes in a multidimensional space, and
   (vi) domain-specific sub-function elements.

13. The method of claim 1, wherein the at least one other function element that comprises a quantitative measure of understandability of the one or more potential variations to the existing policy for the at least one user comprises a quantitative measure of the complexity of the policy variations under consideration.

14. The method of claim 13, comprising determining a complexity metric that is the quantitative measure of how complex each of the one or more potential variations to a policy under consideration is.

15. The method of claim 14, comprising determining the complexity metric in accordance with one or more sub-function elements, wherein the sub-function elements are selected from the group consisting of:
   (i) a function of a number of rules comprising the policy;
   (ii) a function of a complexity of the rules based on attributes comprising any one of conditions, options, and actions associated with each rule;
   (iii) a function of complexity based on data collected through experiments with a representative set of users;
   (iv) a function of complexity based on historical data comprising user feedback;
   (v) a function based on patterns among the rules and patterns within individual rules, including entropy metrics; and
   (vi) domain-specific sub-function elements.

16. The method of claim 1, wherein the objective function comprises a general objective function comprising the user satisfaction metric function element and the quantitative measure of understandability of at least one other function element comprises any one of:

- a deviation metric to measure by how much each of the one or more potential variations to a policy under consideration deviates from the existing policy currently in force in accordance with a deviation function element;
- a complexity metric to measure how complex each of the one or more potential variations to a policy under consideration is, in accordance with a complexity function element; and
- a diversity metric to measure how diverse the set of one or more potential variations to the policy under consideration is, in accordance with a diversity function element.

17. The method of claim 16, comprising determining the general objective function (GOF) according to the following combination:

GOF =user satisfaction metric +deviation metric +complexity metric +diversity metric.

18. The method of claim 1, wherein the objective function comprises a policy evaluation function comprising the user satisfaction function element to determine a user satisfaction metric based on the feedback by the at least one user, and wherein the quantitative measure of understandability of the at least one other function element comprises any one of:

- a deviation metric to determine by how much each of the one or more potential variations to a policy under consideration deviates from the existing policy currently in force, in accordance with a deviation function element;
- a complexity metric to determine how complex each of the one or more potential variations to a policy under consideration is, in accordance with a complexity function element; and
- a diversity metric to determine how diverse the one or more potential variations to the policy under consideration is, in accordance with a diversity function element.

19. The method of claim 1, comprising applying the suggested modifications subject to acceptance by the at least one user.

20. The method of claim 1, wherein the at least one user comprises any one of an end user, an administrator of the policy enforcing computer system, and a person associated with specifying and modifying the policy.

21. The method of claim 1, comprising receiving implicit feedback from the at least one user regarding the one or more decisions made by the program according to the policy.

22. The method of claim 21, comprising considering the feedback to be implicit feedback unless the at least one user provides explicit feedback.

23. The method of claim 22, comprising applying different weights to the implicit feedback by the user satisfaction function element according to whether the implicit feedback from the at least one user is determined to be positive or negative in the absence of explicit feedback from the at least one user.

24. The method of claim 22, comprising determining implicit feedback in accordance with one or more variables selected from the group consisting of the relative recentness of the one or more decisions made by the program, what users provided the feedback, and the roles played by the users.

25. The method of claim 22, comprising combining the feedback data provided by two or more users.

26. The method of claim 1, wherein communication to the at least one user comprises presenting to the user the one or more suggested modifications through any one of a visual representation, a textual representation, an audible representation, and any other meaningful method of interaction with user.

27. The method of claim 1, comprising any one of accepting, rejecting, and modifying the one or more suggested selections by the at least one user in response to the communication of the one or more suggested modifications.

28. The method of claim 1, comprising:

interacting with the policy by a plurality of users;
reviewing one or more suggested modifications to the policy by at least one of the plurality of users;
selecting one or more of the one or more suggested modifications to the policy by the at least one of the plurality of users; and
providing feedback on the policy.

29. The method of claim 28, comprising selecting, by the plurality of users, the one or more suggested modifications to the policy based on a vote.

30. The method of claim 1, comprising selectively disclosing location information of the at least one user in accordance with the policy, wherein the policy is applied in the context of a location-sharing application.

31. The method of claim 1, comprising filtering by a firewall in response to incoming and outgoing packets on a network in accordance with the policy, wherein the policy is applied in the context of a network firewall.

32. The method of claim 1, comprising controlling behavior of a network in response to traffic on the network that pertains to specific applications in accordance with the policy, wherein the policy is applied in the context of an application level firewall.

33. The method of claim 1, comprising determining patterns of traffic on a network indicative of a possible intrusion, or a possible data leakage, or a possible regulatory violation, or a possible violation of corporate or departmental policy, in accordance with the policy, wherein the policy is applied in the context of a relevant detection system.

34. The method of claim 1, comprising selectively disclosing personal information including any one of a calendar, status information, pictures, movies, contextual information and any other relevant information users may want to selectively share with others in accordance with the policy, wherein the policy is applied in the context of social networking applications and may be either an individual policy, a policy applying to a group of users, or a policy applying to all users of a social networking application.

35. The method of claim 1, comprising routing packets on a network in accordance with the policy, wherein the policy is applied in the context of routing devices on the network.

36. The method of claim 1, comprising controlling routers, firewalls, and access points in accordance with the policy, and controlling behavior, connectivity, and security of a home networking device in accordance with the policy, wherein the policy is as applied in the context of home networking devices.

37. The method of claim 1, comprising defining a model of the preferences, likes, and dislikes of the at least one user pertaining to products and services in accordance with the policy, wherein the policy is applied in the context of recommender systems for products and services.

38. The method of claim 1, comprising defining a set of patterns within computer programs that represent errors or inefficiencies and a set of proposed improvements to the errors or inefficiencies in accordance with the policy, wherein the policy is applied in the context of software development environments for programming, debugging, and static analysis.

39. The method of claim 1, comprising filtering email messages and determining any one of junk emails, illegitimate solicitation emails, or legitimate emails in accordance with the policy, wherein the policy is applied in the context of email filtering applications.

40. The method of claim 1, wherein the policy is applied to monitor and control processes in plants or other facilities and to control actions, alerts and other relevant decisions such as those made in a Supervisory Control and Data Acquisition (SCADA) or other system supporting similar functionality.

41. The method of claim 1, wherein the neighborhood procedure is selected from the group consisting of: a hill climbing procedure, a simulated annealing search procedure, a genetic algorithm, a Tabu search procedure, a random optimization procedure, a swarm intelligence algorithm, an evolutionary algorithm, a meta-heuristic search procedure, a local search, and a computational learning procedure.

42. A computer system for allowing at least one user to control updates to an existing policy that is enforced by a computer program, the computer system comprising:

at least one processor and a memory coupled to the at least one processor, wherein the at least one processor is programmed to:

communicate to at least one user data regarding one or more decisions made by the program according to one or more versions of the policy, wherein policy data for the policy is stored in a machine readable format in a memory coupled to the computer system;

store in a machine readable format user feedback data indicative of feedback by the at least one user regarding the one or more decisions made by the program according to the policy;

determine, based on the user feedback data regarding the one more decisions made by the program, one or more potential variations to the existing policy using a neighborhood procedure, wherein the one or more potential variations are generated using neighborhood operators;

rank the one or more potential variations to the existing policy based on a score of an objective function, wherein the objective function comprises a plurality of function elements, and wherein the plurality of function elements comprises a user satisfaction function element and at least one other function element that comprises a quantitative measure of understandability of the one or more potential variations to the existing policy for the at least one user that measures an extent to which the one or more potential variations are likely to be understandable by the at least one user;

communicate to the at least one user, one or more suggested modifications to the existing policy based on the ranking of the one or more potential variations to the policy, wherein the one or more suggested modifications can assist the at least one user refine the policy;

receive one or more selections from the user that are responsive to the one or more suggested modifications to the existing policy communicated to the at least one user; and modify the policy data stored in the memory based on one or more selections by the at least one user in response to the communication of the one or more suggested modifications to the at least one user to generate an updated policy for the at least one user.

43. An article comprising a non-transitory computer-readable storage medium comprising executable computer program instructions that when executed enable a computing system to allow at least one user to control updates to an existing policy that is enforced by a policy enforcement computer program by causing the computing system to:

communicate to at least one user data regarding one or more decisions made by the policy enforcement computer program according to one more versions of the policy, wherein policy data for the policy is stored in a machine readable format in a memory coupled to the computer system;

store in a machine readable format user feedback data indicative of feedback by the at least one user regarding the one or more decisions made by the program according to the policy;

determine, based on the user feedback data regarding the one more decisions made by the program, one or more potential variations to the existing policy using a neighborhood procedure, wherein the one or more potential variations are generated using neighborhood operators;

rank one or more potential variations to the existing policy based on a score of an objective function, wherein the objective function comprises a plurality of function elements, and wherein the plurality of function elements comprises a user satisfaction function element and at least one other function element that comprises a quantitative measure of understandability of the one or more potential variations to the existing policy for the at least one user that measures an extent to which the one or more potential variations are likely to be understandable by the at least one user;

communicate to the at least one user, one or more suggested modifications to the existing policy based on the ranking of the one or more potential variations to the existing policy, wherein the one or more suggested modifications can assist the at least one user refine the policy;

receive one or more selections from the user that are responsive to the one or more suggested modifications to the existing policy communicated to the at least one user; and modify the policy data stored in the memory based on one or more selections by the at least one user in response to the communication of the one or more suggested modifications to the at least one user to generate an updated policy for the at least one user.

* * * * *